United States Patent
Haus et al.

(10) Patent No.: US 12,403,601 B2
(45) Date of Patent: Sep. 2, 2025

(54) SYSTEM AND METHOD FOR QUEUEING ROBOT OPERATIONS IN A WAREHOUSE ENVIRONMENT BASED ON WORKFLOW OPTIMIZATION INSTRUCTIONS

(71) Applicant: Gideon Brothers d.o.o., Osijek (HR)

(72) Inventors: Tomislav Haus, Donja Stubica (HR); Petra Maždin Stepić, Slano (HR); Fran Ante Lončar, Zagreb (HR)

(73) Assignee: Gideon Brothers d.o.o., Osijek (HR)

( * ) Notice: Subject to any disclaimer, the term of this patent is extended or adjusted under 35 U.S.C. 154(b) by 146 days.

(21) Appl. No.: 18/510,041

(22) Filed: Nov. 15, 2023

(65) Prior Publication Data
US 2024/0157556 A1     May 16, 2024

Related U.S. Application Data

(60) Provisional application No. 63/425,333, filed on Nov. 15, 2022.

(51) Int. Cl.

| | |
|---|---|
| *B25J 9/16* | (2006.01) |
| *G05D 1/246* | (2024.01) |
| *G05D 1/646* | (2024.01) |
| *G05D 1/69* | (2024.01) |
| *G05D 105/80* | (2024.01) |
| *G05D 107/70* | (2024.01) |
| *G05D 111/10* | (2024.01) |

(Continued)

(52) U.S. Cl.
CPC ............ *B25J 9/1664* (2013.01); *B25J 9/161* (2013.01); *B25J 9/162* (2013.01); *G05D 1/2462* (2024.01); *G05D 1/646* (2024.01); *G05D 1/69* (2024.01); *G06V 10/82* (2022.01); *G05D 2105/87* (2024.01); *G05D 2107/70* (2024.01); *G05D 2111/10* (2024.01); *G05D 2111/65* (2024.01)

(58) Field of Classification Search
CPC .......... B25J 9/1664; B25J 9/161; B25J 9/162; G05D 1/2462; G05D 1/646; G05D 1/69; G05D 2105/87; G05D 2107/70; G05D 2111/10; G05D 2111/65; G05D 1/667; G05D 2105/28; G05D 1/6987; G05D 1/246; G05D 2109/10; G06V 10/82; G06Q 10/08
See application file for complete search history.

(56) References Cited

U.S. PATENT DOCUMENTS 5,847,755 A * 12/1998 Wixson ...................... G06T 1/20
                                                348/149
6,131,809 A * 10/2000 Drescher ............... G07F 19/203
                                                235/375

(Continued)

*Primary Examiner* — Bhavesh V Amin
(74) *Attorney, Agent, or Firm* — Standley Law Group LLP; Jeffrey S. Standley; Bryan P. Finneran

(57) ABSTRACT

A system and method are described that provide for queueing robot operations in a warehouse environment based on workflow optimization instructions. In one example of the system/method of the present invention, a control system causes certain robots to queue proximate to one another to permit resources to be obtained, transported, deposited, etc. without the robots crashing into one another (or into other objects), or forming traffic jams. A robot may remain at an assigned queue position at least until another position assigned to the robot becomes available.

20 Claims, 28 Drawing Sheets

(51) Int. Cl.
*G05D 111/63* (2024.01)
*G06V 10/82* (2022.01)

(56) References Cited

U.S. PATENT DOCUMENTS

| | | | | |
|---|---|---|---|---|
| 6,264,101 B1* | 7/2001 | Ryan | G07D 11/16 | 902/8 |
| 6,607,081 B2* | 8/2003 | Graef | G06Q 20/102 | 209/534 |
| 7,437,279 B2* | 10/2008 | Agrawala | G01C 21/367 | 715/866 |
| 7,991,576 B2* | 8/2011 | Roumeliotis | G01C 21/12 | 702/158 |
| 8,577,539 B1* | 11/2013 | Morrison | G06T 7/571 | 701/28 |
| 9,607,401 B2* | 3/2017 | Roumeliotis | G06T 7/248 | |
| 9,741,140 B2* | 8/2017 | Birchfield | G06T 11/206 | |
| 9,996,941 B2* | 6/2018 | Roumeliotis | G01C 21/1656 | |
| 10,012,504 B2* | 7/2018 | Roumeliotis | G01C 21/1656 | |
| 10,203,209 B2* | 2/2019 | Roumeliotis | G01C 21/3841 | |
| 10,371,529 B2* | 8/2019 | Roumeliotis | G06V 20/56 | |
| 10,388,041 B2* | 8/2019 | Birchfield | G06T 11/206 | |
| 10,395,116 B2* | 8/2019 | Todeschini | G01S 5/02585 | |
| 10,466,953 B2* | 11/2019 | Eade | G03H 1/0005 | |
| 10,518,879 B1* | 12/2019 | Zhang | G06V 20/10 | |
| 10,732,647 B2* | 8/2020 | Shen | G01C 21/1654 | |
| 10,884,430 B2* | 1/2021 | Kumar | G05D 1/104 | |
| 10,907,971 B2* | 2/2021 | Roumeliotis | G06T 7/74 | |
| 10,943,120 B2* | 3/2021 | Zahnert | G06F 3/0304 | |
| 11,118,911 B2* | 9/2021 | Flint | G06T 7/246 | |
| 11,466,990 B2* | 10/2022 | Roumeliotis | G06T 7/70 | |
| 11,579,298 B2* | 2/2023 | Shin | G01S 17/89 | |
| 11,874,399 B2* | 1/2024 | Shin | H04B 1/38 | |
| 11,940,277 B2* | 3/2024 | Roumeliotis | G01C 21/28 | |
| 12,291,407 B2* | 5/2025 | Molina | B65G 47/52 | |
| 2002/0011431 A1* | 1/2002 | Graef | G07F 19/202 | 271/227 |
| 2002/0198632 A1* | 12/2002 | Breed | G01S 17/86 | 701/472 |
| 2004/0073360 A1* | 4/2004 | Foxlin | G01C 21/188 | 342/357.31 |
| 2004/0167667 A1* | 8/2004 | Goncalves | G05D 1/0231 | 700/250 |
| 2008/0033645 A1* | 2/2008 | Levinson | G01S 19/49 | 701/469 |
| 2008/0167814 A1* | 7/2008 | Samarasekera | G01C 21/1656 | 701/469 |
| 2008/0279421 A1* | 11/2008 | Hamza | G06T 7/70 | 382/103 |
| 2009/0248304 A1* | 10/2009 | Roumeliotis | H04W 4/027 | 701/500 |
| 2010/0110187 A1* | 5/2010 | von Flotow | G01C 11/025 | 348/E7.085 |
| 2012/0121161 A1* | 5/2012 | Eade | G06F 16/444 | 901/1 |
| 2012/0194517 A1* | 8/2012 | Izadi | G06F 3/011 | 345/420 |
| 2012/0306847 A1* | 12/2012 | Lim | G06T 7/579 | 345/418 |
| 2014/0206443 A1* | 7/2014 | Sharp | G06T 7/75 | 463/31 |
| 2014/0228995 A1* | 8/2014 | Tanaka | B24B 27/0023 | 700/112 |
| 2014/0316698 A1* | 10/2014 | Roumeliotis | G06T 7/70 | 701/500 |
| 2015/0204598 A1* | 7/2015 | Affleck | B65B 3/003 | |
| 2015/0304634 A1* | 10/2015 | Karvounis | G06F 18/21355 | 348/46 |
| 2019/0114777 A1* | 4/2019 | Maity | G06T 7/579 | |
| 2019/0188474 A1* | 6/2019 | Zahnert | G02B 27/017 | |
| 2019/0377952 A1* | 12/2019 | Kim | G06T 7/579 | |
| 2021/0142095 A1 | 5/2021 | Shi | | |
| 2021/0323768 A1* | 10/2021 | Lisso | B65G 1/1375 | |
| 2023/0115863 A1* | 4/2023 | Molina | B65G 61/00 | 414/788 |
| 2023/0259878 A1* | 8/2023 | Jacquemart | G06Q 10/087 | 705/28 |
| 2024/0027226 A1 | 1/2024 | Juette et al. | | |
| 2024/0066715 A1* | 2/2024 | Maegawa | H01L 21/67718 | |
| 2024/0094975 A1 | 3/2024 | Eade et al. | | |
| 2024/0135707 A1 | 4/2024 | Zahnert et al. | | |
| 2024/0157556 A1* | 5/2024 | Haus | B25J 9/162 | |
| 2024/0196912 A1* | 6/2024 | Mitani | B25J 15/0293 | |
| 2025/0139571 A1* | 5/2025 | Nandakumar | G07C 9/00896 | |

\* cited by examiner

Algorithm 2. Item assignment for a set of open orders O
84

Input parameters:
    List of items $I$ of all open orders $O$
    List of available pickers P
    List of available robots R
Every event $e$ do:
    for every open order o
        calculate time when robot $r$ arrives at the next item $T_a(r, i_y)$
    for every picker
        calculate picker $p$ travel time between two items $T_t(p, i_x, i_y)$
    while (unscheduled items or scheduling horizon $h$ exceeded)
select order/robot $r$ with minimum robot arrival time $T_a(r, i)$
choose a picker $p$ from a list of pickers for order $o$/item $i$
calculate picker arrival time $T_a(p, i)$
use max($T_a(p, i)$, $T_a(r, i)$) for picking start time
update picker travel time $T_t(p, i_x, i_y)$
    update robot arrival time $T_a(r, i_z)$ at the next item

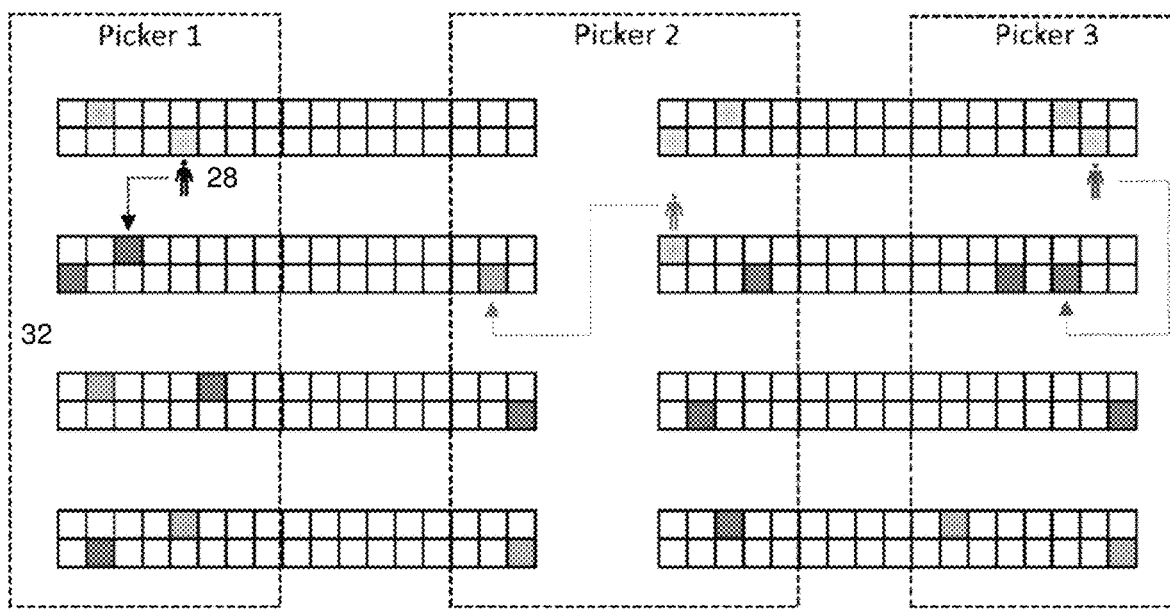

FIG. 12

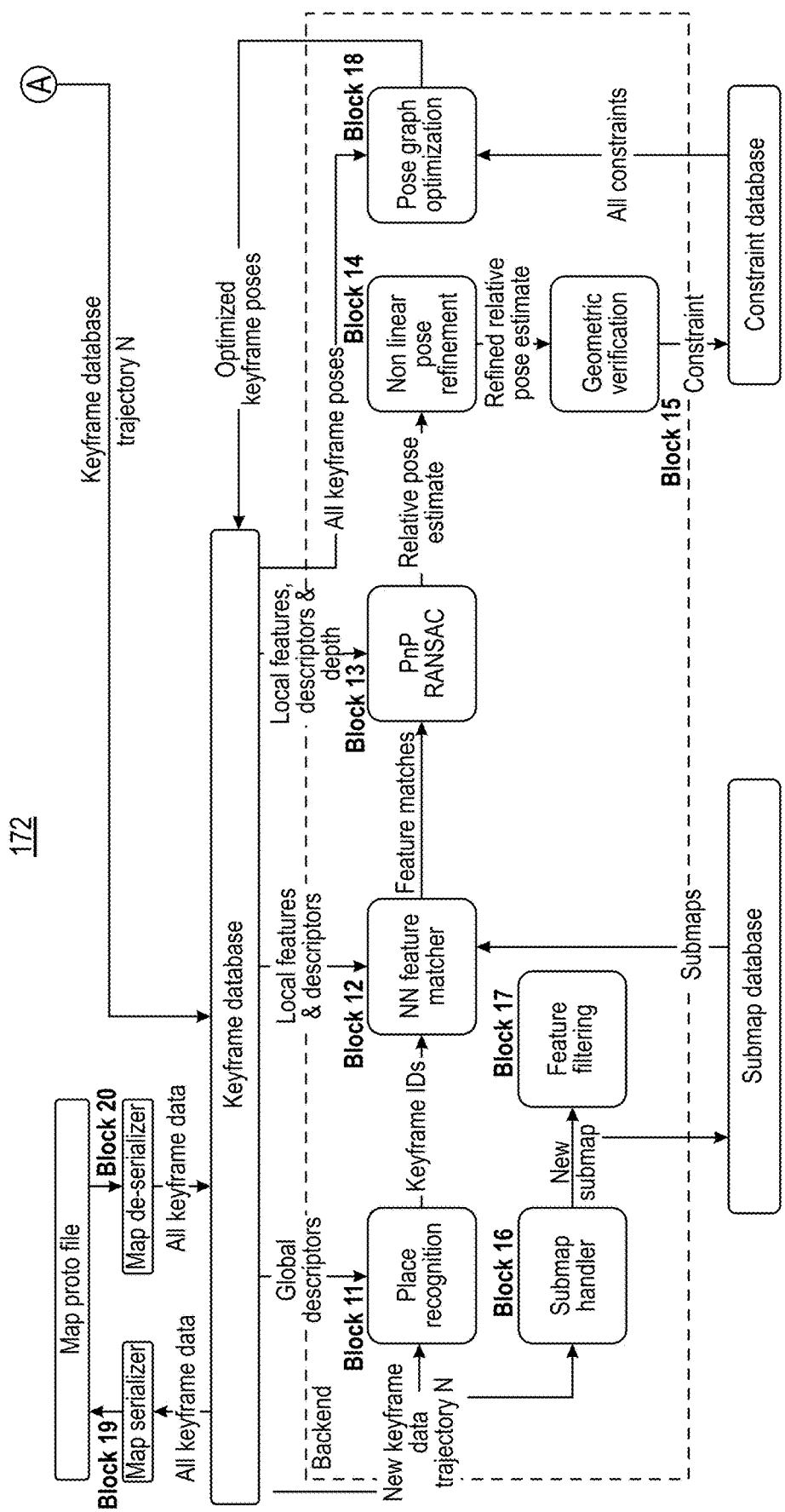
FIG. 31(Cont...)

SYSTEM AND METHOD FOR QUEUEING ROBOT OPERATIONS IN A WAREHOUSE ENVIRONMENT BASED ON WORKFLOW OPTIMIZATION INSTRUCTIONS

CROSS-REFERENCE TO RELATED APPLICATIONS

This non-provisional patent application claims priority to U.S. Provisional Application Ser. No. 63/425,333, filed on Nov. 15, 2022, the disclosure of which is incorporated by reference as if fully recited herein.

TECHNICAL FIELD

The present invention relates generally to robot operations in a warehouse environment, and more particularly to a system and method for queueing robots in a warehouse environment based on workflow optimization instructions. In one example embodiment, a control system causes robots to queue proximate to one another to permit resources to be obtained, transported, deposited, or the like. The control system may prevent the robots from crashing into one another or into other objects. The control system may also prevent robot traffic jams from forming. A robot may remain at an assigned queue position at least until a subsequent position assigned to the robot becomes available.

BACKGROUND AND SUMMARY OF THE INVENTION

Warehouse operations, such as warehouse inventory management and workflow, have been managed according to policies and processes known as Warehouse Management Systems ("WMSs"). Traditional WMSs may involve documents such as spreadsheets that list items received and stored in a warehouse. Traditional WMSs may also involve distributing product orders and instructions to warehouse workers. For example, when one or more product orders and instructions for the order(s) are received, one or more workers may then be directed to retrieve one or more empty pallets and place ordered products on the pallet(s) according to order instructions. The pallets, once loaded, may then be directed to a location for delivery. Product orders are traditionally handled in the order that said orders are received.

An issue with traditional WMSs is that a tremendous amount of time, labor, materials and energy are required to manage warehouse operations. When product orders are handled without optimal consideration of warehouse geospatial factors to streamline the delivery process, and without carefully regulated assistance from autonomous, non-human elements (e.g., AMRs) to streamline the delivery process, the costs to the warehouse in time, labor, material, energy, some combination thereof, or the like may be higher than optimal. These costs may also be reflected in higher product prices, delayed product deliveries, some combination thereof, or the like. For example, when robots are employed for warehouse operations without being optimally directed to account for geospatial factors, any number of different issues may occur. As a more specific example, when said robots are not carefully directed to queue in an organized fashion, issues such as, e.g., collisions, traffic, obstructions, and the like may occur.

The aforementioned shortcomings speak to the need for streamlined warehouse operations wherein geospatial factors are accounted for and autonomous, non-human elements are carefully regulated to promote operations efficiency.

In view of this, it is beneficial to have a system and method for queueing robot operations in a warehouse environment based on workflow optimization instructions.

According to the present invention in one aspect, an exemplary system and its corresponding method involve one or more central processors and a plurality of robots. Each of the robots may be in communication with at least one of said one or more central processors. Each of the robots may be capable of performing an activity. The activity may be obtaining, transporting, and/or depositing a resource, such as for inventory management purposes (which may be related to warehouse operations). Each robot of the plurality of robots may be capable of traveling to any of a number of different queuing positions.

Software instructions of the one or more central processors may be capable of causing a first robot of the plurality of robots to travel to a first queuing position of the number of different queuing positions. The first queuing position may be adjacent to and separate from a second queuing position occupied by a second robot of the plurality of robots. Software instructions of the one or more central processors may be capable of causing the first robot to remain at the first queuing position at least until a subsequent position assigned to the first robot is available.

Exemplary embodiments of the present invention may prevent collisions and traffic among the robots, and provide advantages such as, e.g., optimizing the time, labor, materials and energy required to manage warehouse operations.

BRIEF DESCRIPTION OF THE DRAWINGS

Novel features and advantages of the present invention, in addition to those expressly mentioned herein, will become apparent to those skilled in the art from a reading of the following detailed description in conjunction with the accompanying drawings. The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 12 illustrates other exemplary logic for directing robot picking activity in a warehouse environment;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
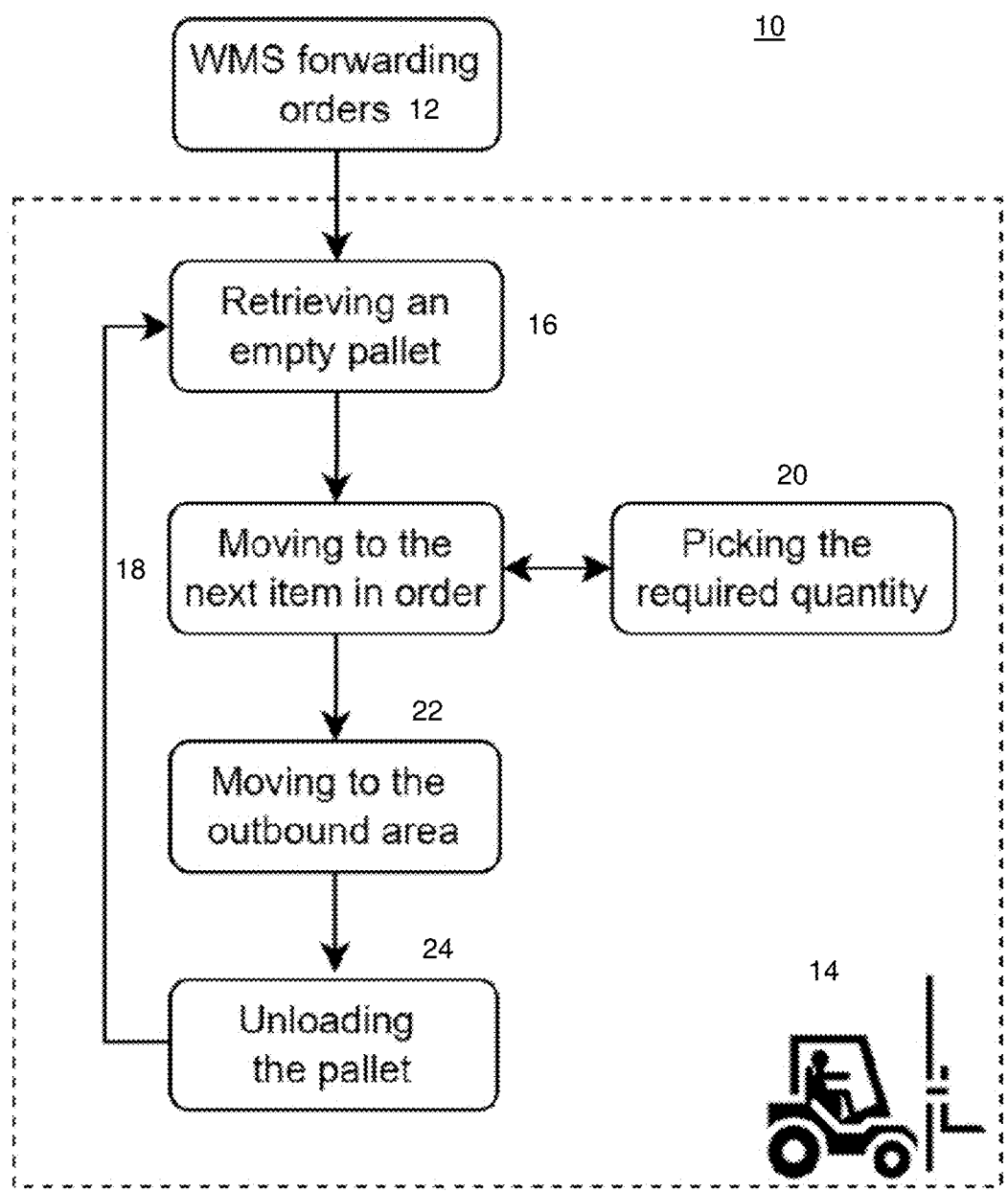
FIG. 1 illustrates logic for a known WMS.
Figure 15:
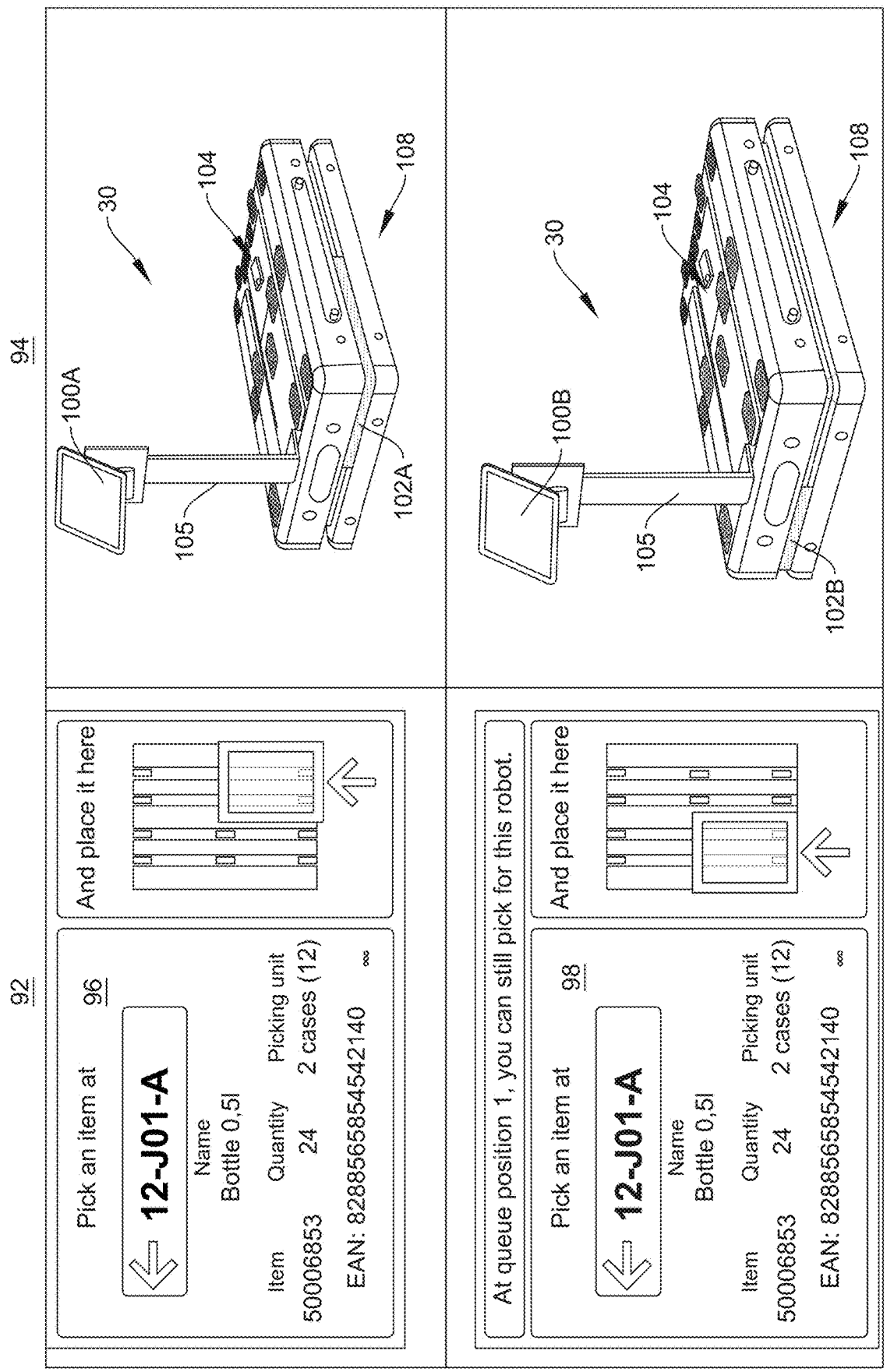
FIG. 15 illustrates exemplary robots and interfaces thereof in accordance with an exemplary embodiment of the present invention.
Figure 16:
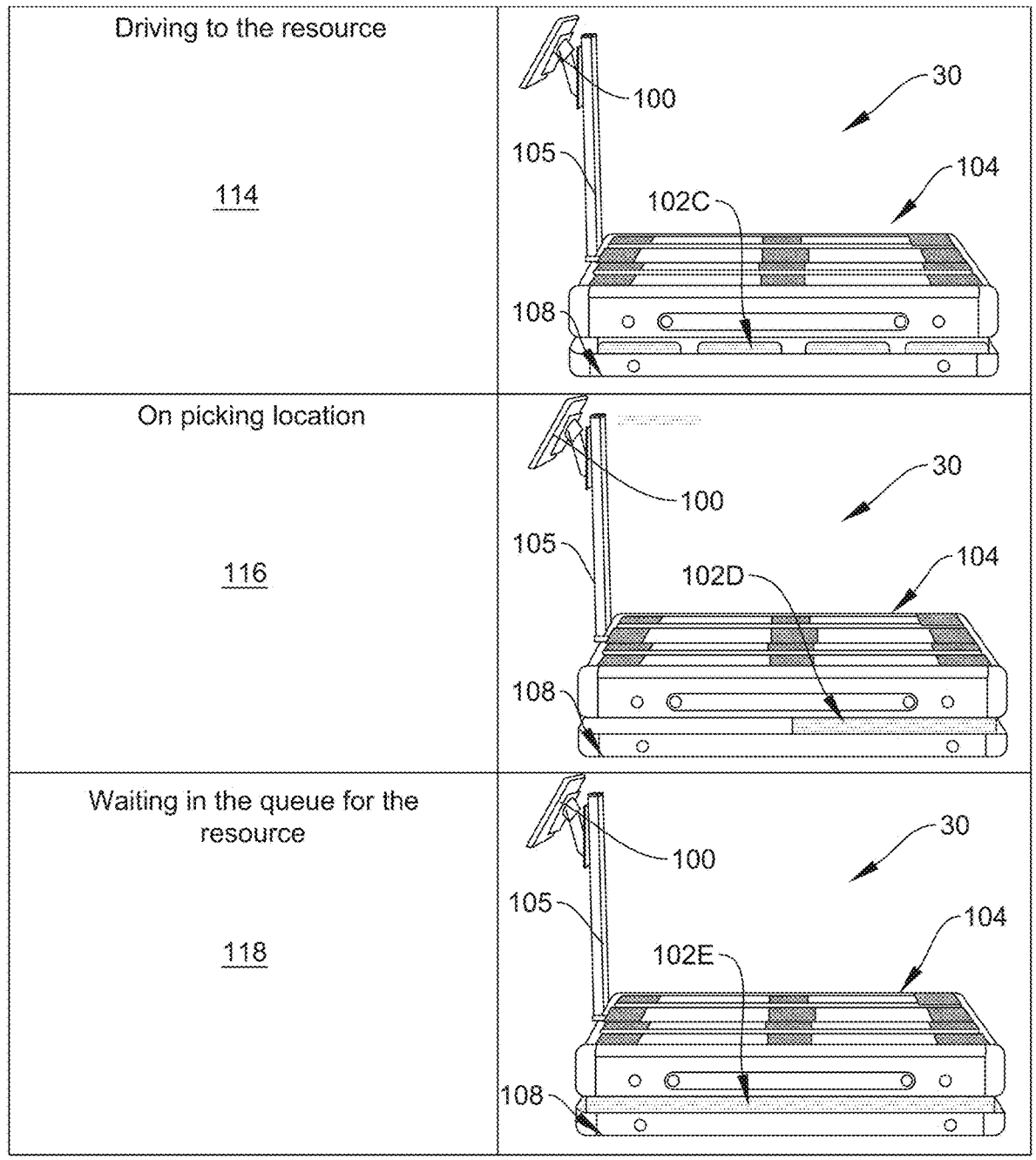
FIG. 16 illustrates exemplary robots in accordance with an exemplary embodiment of the present invention.
Figure 28:
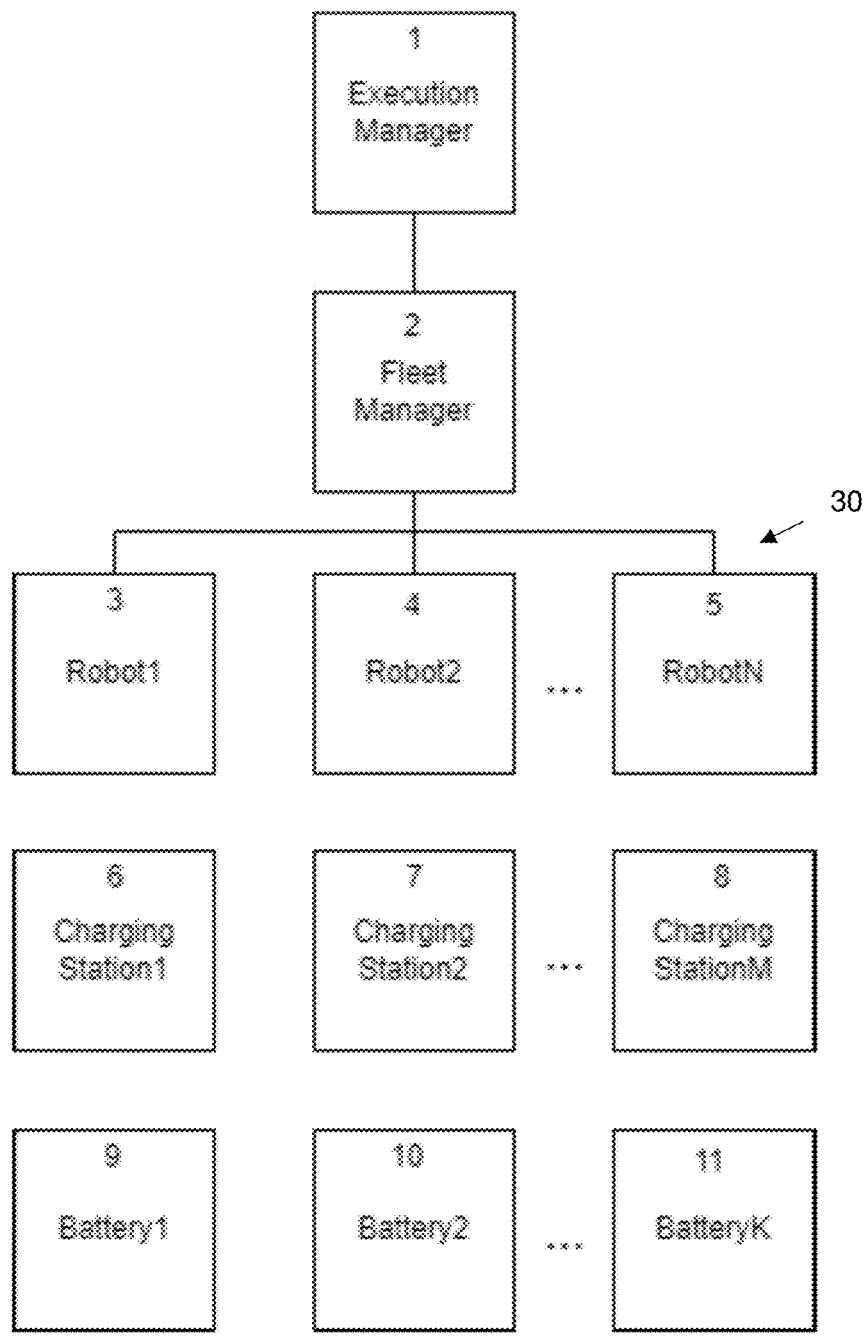
FIG. 28 illustrates exemplary logic for streamlined fulfilling of robot energy requirements in a warehouse environment in accordance with an exemplary embodiment of the present invention.
Figure 29:
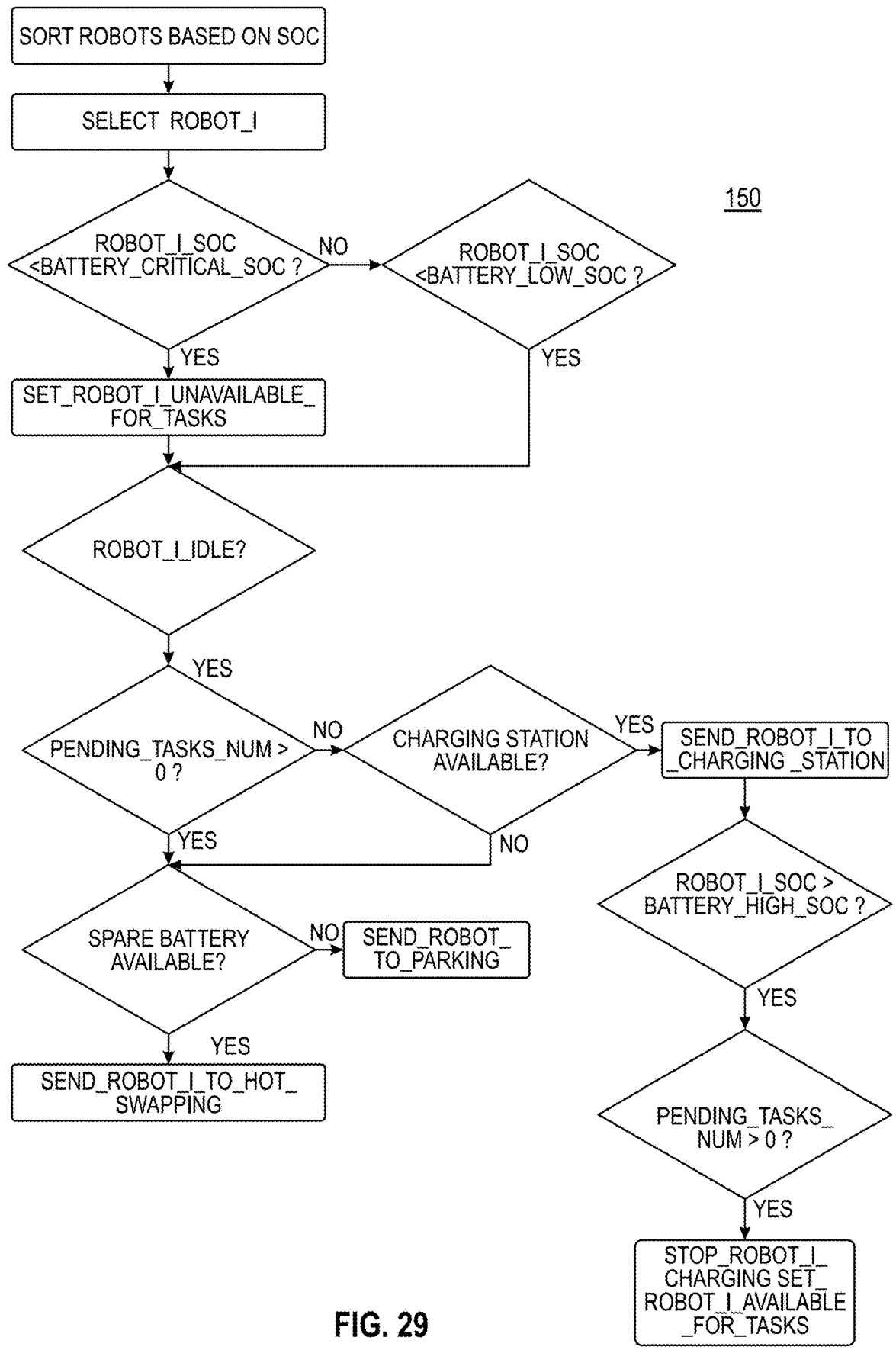
FIG. 29 illustrates other exemplary logic for streamlined fulfilling of robot energy requirements in a warehouse environment in accordance with an exemplary embodiment of the present invention.
Figure 30:
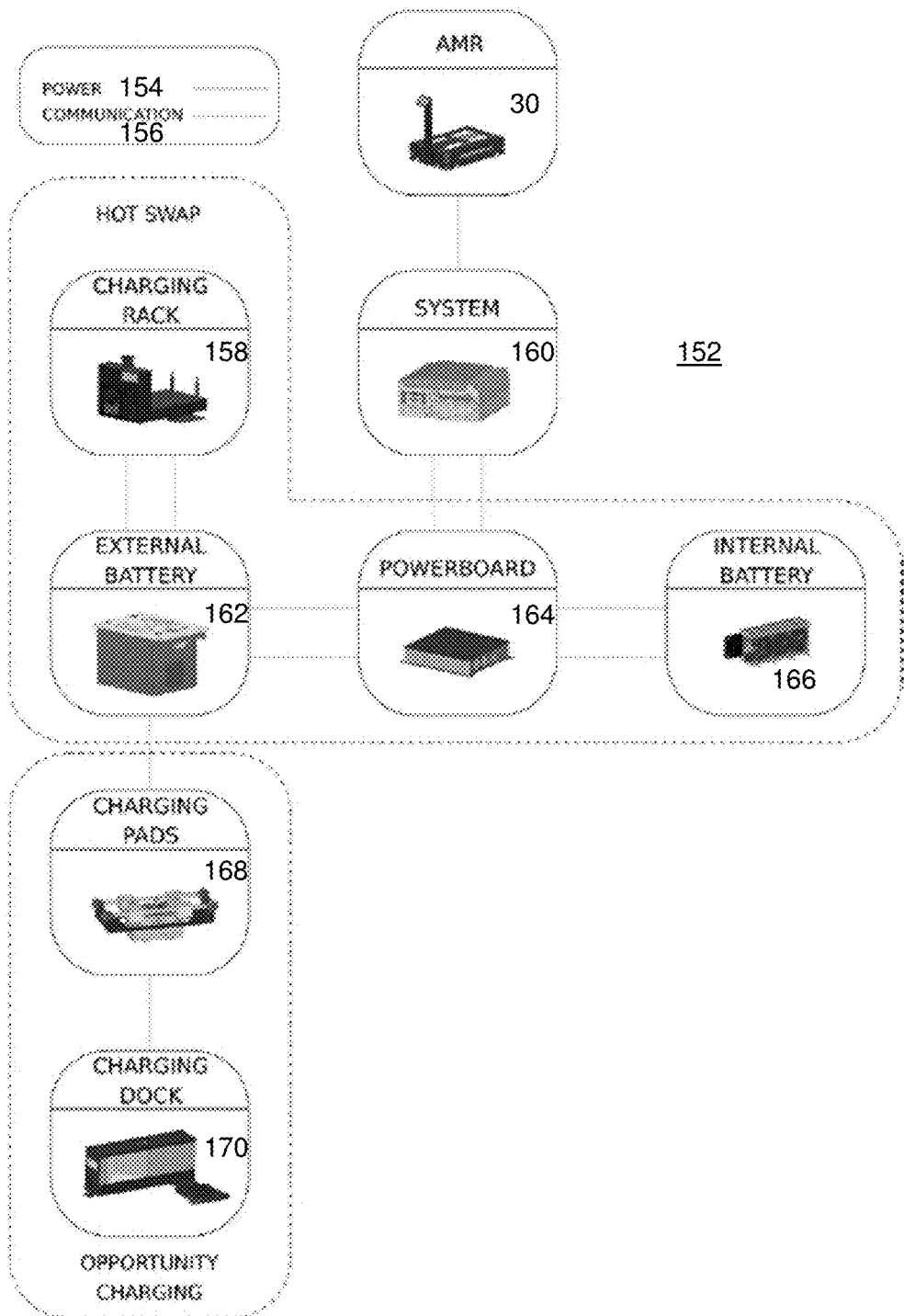
FIG. 30 illustrates exemplary components for streamlined fulfilling of robot energy requirements in a warehouse environment in accordance with an exemplary embodiment of the present invention.
Figure 31:
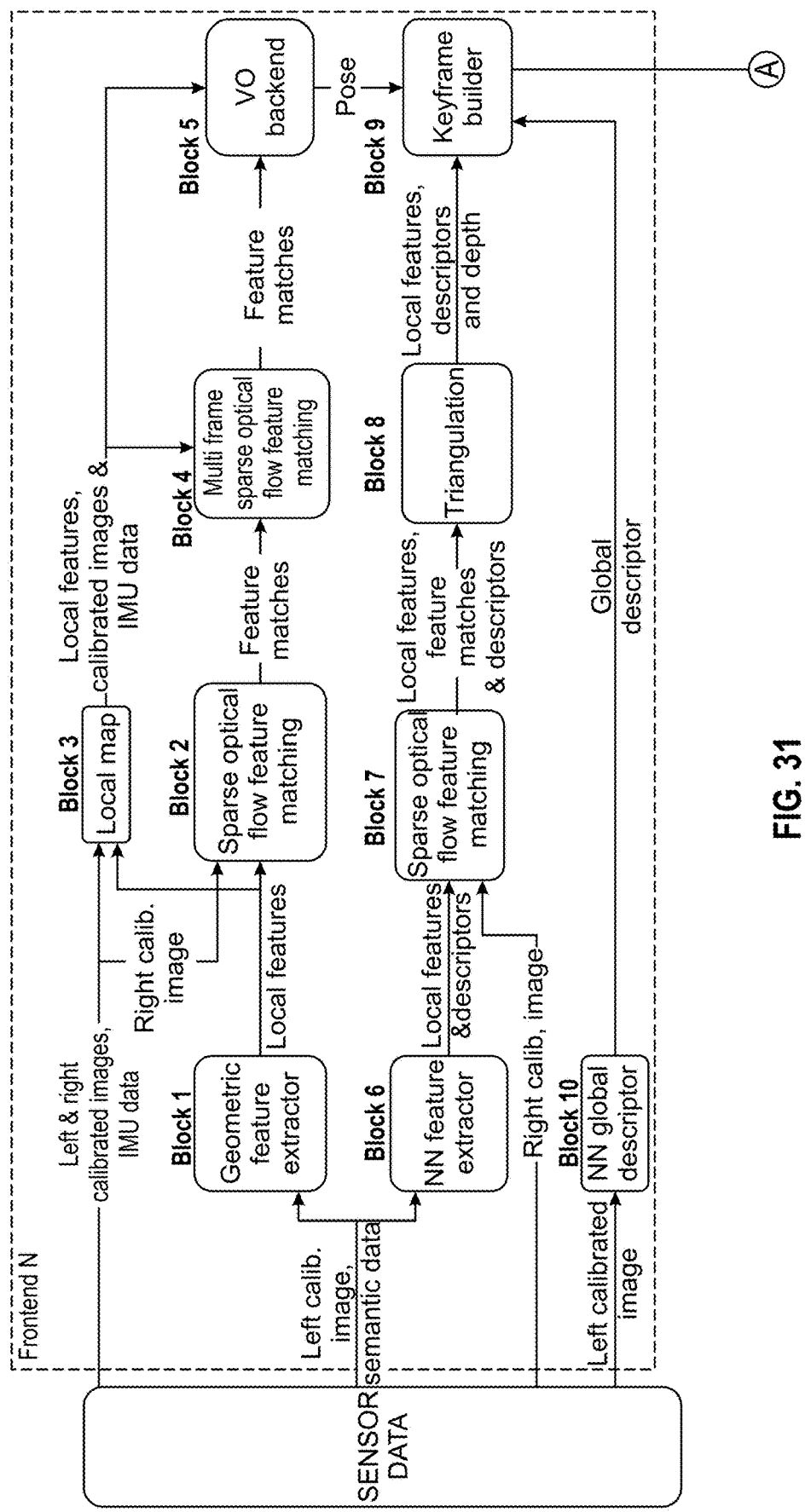
FIG. 31 illustrates exemplary logic for mapping features of a warehouse environment having improved workflow in accordance with an exemplary embodiment of the present invention.

Generally speaking, FIG. 1 relates to a known WMS. FIGS. 2 through 14 relate to exemplary embodiments of a system and method for directing robot picking activity in a warehouse environment. FIGS. 15 through 16 relate to exemplary embodiments of a system and method for organizing communication between humans and robots in a warehouse environment. FIGS. 17 through 21 relate to exemplary embodiments of a system and method for queueing robots in a warehouse environment based on workflow optimization instructions. FIGS. 22 through 27 relate to exemplary embodiments of a system and method for organizing interaction between robots and human-operated forklifts in a warehouse environment. FIGS. 28 through 30 relate to exemplary embodiments of a system and method for streamlining fulfillment of robot energy requirements in a warehouse environment. FIG. 31 relates to exemplary embodiments of a system and method for mapping features of a warehouse environment having improved workflow.

Referring initially to FIG. 1, logic for an example known WMS 10 is shown. Here, one or more product orders (e.g., WMS forwarding orders 12) may be directed to one or more warehouse workers (e.g., forklift operator 14) (wherein "forklift" refers to any vehicle providing the capacity to access items across various heights, and substantially lower said items towards ground level). The worker(s) may then be directed to retrieve one or more empty pallets 16 and place ordered products/items on the pallet(s), moving from line to line across a warehouse selecting designated items 18 and or containers at required quantities 20 (e.g., according to order instructions 12). At each line, the worker(s) may be required to locate items and/or cases therefor and manually place items and/or cases therefor onboard a human operated vehicle (e.g., forklift). The worker(s) may further be required to confirm the aforementioned action using a picker device, including by way of example and not limitation, a handheld radiofrequency scanner, a ring scanner, a headset, a smartphone, a head-mounted display, some combination thereof, or the like for inventory tracking. The pallets, once loaded, may then be directed by a worker (e.g., forklift operator 14) to a printer to retrieve a shipping label. Thereafter, the pallets may be directed to a location for delivery, including by way of example and not limitation, a designated shipping area 22, which may be located at or near outbound docks. Pallets may then be unloaded 24 for product delivery. In the aforementioned example, product orders are handled by warehouse workers in the order that said orders are received. Known warehouse management is time consuming and costly, thus it is beneficial to have streamlined warehouse operations wherein geospatial factors are accounted for and autonomous, non-human elements promote operations efficiency.

Figure 2:
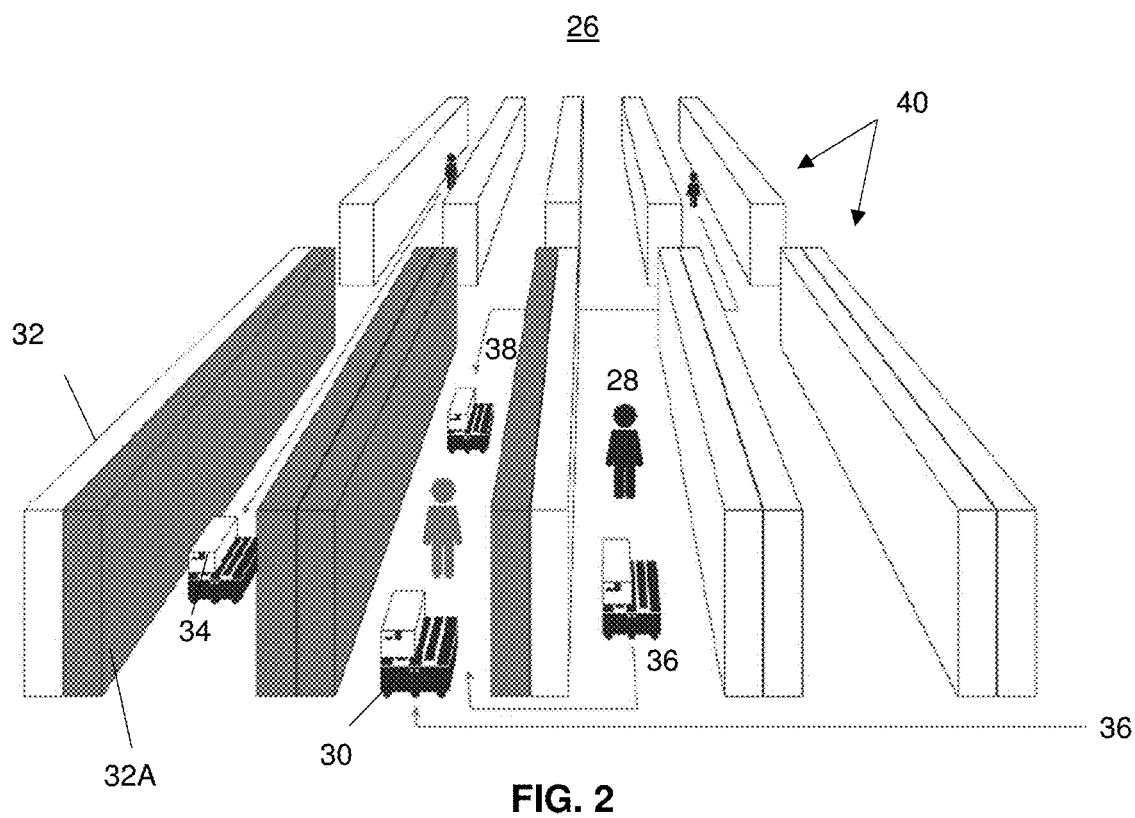
FIG. 2 illustrates direction of robot picking activity in a warehouse environment in accordance with an exemplary embodiment of the present invention.

Referring now to FIG. 2, an exemplary management system for robot picking activity in a warehouse environment 26 is shown in accordance with a preferred embodiment of the present invention. In this particular embodiment, warehouse order handling and related workflow is implemented according to a system comprising both a number of human operators 28 and a number of robots 30. Any number of different items for potential orders may be stored at a number of storage racks 32 across multiple lines 40 of a warehouse. A robot 30 may be directed 36 to a designated storage rack 32A to retrieve a particular quantity of a particular item, wherein the particular quantity of the particular item may be positioned in or on one or more containers or pallets 34. The containers or pallets 34 may be configured to secure items as the items are transported from designated storage racks (e.g., 32A) to a designated shipping area. Exemplary pallets (e.g., 34) may be configured to secure any number of different items of any number of different quantities. In certain preferred embodiments, pallets are substantially loaded to capacity before items thereon or therein are transported to a designated shipping area. However, it will be apparent to one of ordinary skill in the art that any number of different pallets may be loaded with any number of different items and/or cases therefor without departing from the scope of the present invention.

A pallet (e.g., 34) may be designated by the management system 26 to secure and deliver to the designated shipping area all items from a single particular order. In some cases, a single particular order may require multiple pallets. Each pallet (e.g., 34) may be configured to secure a number of different cases having ordered items positioned therein. A human operator (e.g., 28) may be directed 38 to place items from a particular location of a designated storage rack 32A onto a pallet (e.g., 34) and/or cases on a pallet positioned on a platform of a robot 34 ("robot platform") (a pallet or similar surface maintained by a robot, the surface adapted to receive items for transportation).

Order picking may additionally or alternatively involve transportation by way of a forklift (e.g., controlled by a human operator) of a loaded pallet from a designated storage rack 32A to a platform of a robot 34. Order picking may additionally or alternatively involve a human operator (e.g., 28) being directed 38 to place cases containing items from a particular location of a designated storage rack 32A onto a pallet (e.g., 34) positioned on a platform of a robot 34. It will be apparent to one of ordinary skill in the art that certain functions described herein as being executed by a human operator are not necessarily limited to requiring a human operator. By way of example and not limitation, human placement of items into a pallet or cases positioned on a robot may be substituted by robot placement of items into a pallet or cases positioned on a robot without departing from the scope of the present invention.

After the pallets 34 are loaded, the pallets may be processed, transported to a designated shipping area, and thereafter loaded into a transportation vessel, including by way of example and not limitation, a trailer or shipping container of a truck. Transportation of the pallets from the designated storage rack 32A to the transportation vessel or loading dock thereof may be accomplished by the robot 30. The exemplary management system 26 may be configured to distribute orders throughout each workday at a warehouse, estimate the required number of workers to complete each of said orders, including by way of example and not limitation, forklift operators required to complete each order, implement order sequencing, and assign particular warehouse workers to each order.

Figure 3:
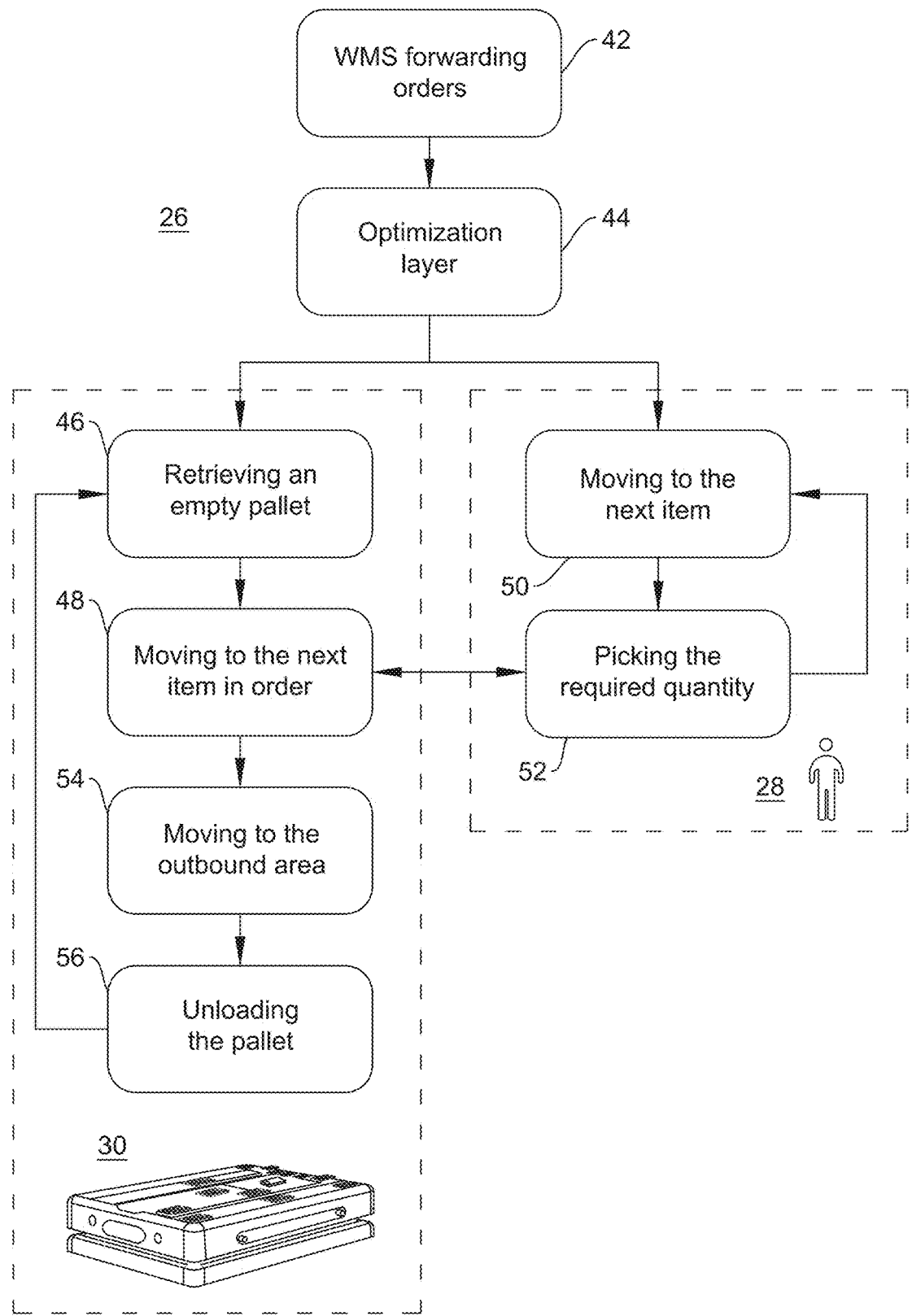
FIG. 3 illustrates exemplary logic for directing robot picking activity in a warehouse environment in accordance with the FIG. 2 embodiment.

Referring now to FIG. 3, the exemplary management system 26 may involve assignments for both robot 30 and human 28 actors. As an order 42 is received, a robot 30 may be directed by the exemplary management system 26 to retrieve an empty pallet 46 and move to a first designated storage rack location where certain items from the order 42 are located. After the robot 30 arrives at the first designated storage rack location where certain items from the order 42 are located, a picker (an entity directed to move items from storage to a robot for subsequent transportation) (in this particular embodiment, the picker is a human picker 28) may be directed by the exemplary management system 26 to move 50 to the first designated storage rack location where certain items from the order 42 are located. After the human picker 28 arrives at the first designated storage rack location where certain items from the order 42 are located, the human picker 28 may pick 52 the required quantities of said certain items (e.g., based on stock keeping unit, "SKU") and place the items (and/or cases therefor, if applicable) on a platform of the robot 30. Thereafter, the robot 30 may be directed by the exemplary management system 26 to move 48 to subsequent designated storage rack locations where additional required items from the order 42 are located, and the human picker 28 may be directed to move to the subsequent locations to place the additional required items on the platform of the robot 30. The robot 30 may be directed to remain static after arriving at each location until the human picker 28 has finished placing required items corresponding to the location on the platform of the robot 30.

The human picker 28 is not limited to following any particular robot 30 from line to line during fulfillment of a particular order. For example, certain human pickers 28 may be directed to operate in certain designated regions of the warehouse, and address orders for robots 30 that come through the human picker's 28 designated region to promote order filling speed and efficiency. Forklift energy consumption requirements may be reduced by not having forklift operators moving regularly across boundaries of an entire warehouse. As another example, a human picker 28 may be directed to move between picking locations of other pallets handled by different robots based on proximity factors, temporal factors, some combination thereof, or the like. It will also be apparent to one of ordinary skill in the art that a robot 30 may engage in filling more than one order as the robot 30 traverses warehouse lines without departing from the scope of the present invention. When ordered items designated to a particular robot 30 have all been filled on a platform of a robot 30, or when the platform of the robot is full, the robot 30 may then be directed to move 54 to an outbound area and unload the pallet 56, such as by way of example and not limitation, at a loading dock or in a transportation container.

Figure 4:
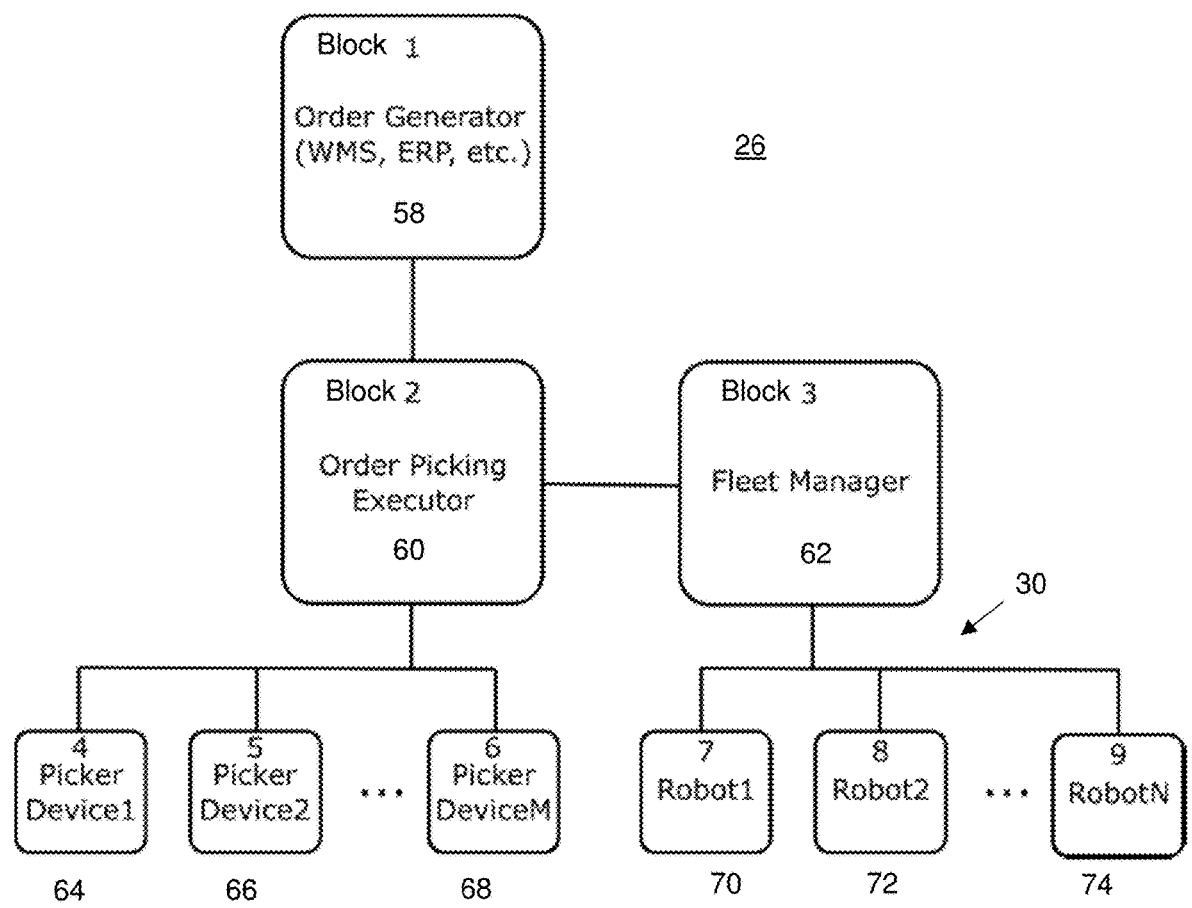
FIG. 4 illustrates other exemplary logic for directing robot picking activity in a warehouse environment.

Referring now to FIG. 4, an exemplary management system 26 may involve a plurality of picking operations systems (referred to herein as "blocks"). Referring to Block 1, the management system 26 may be configured to generate orders 58 to be submitted to the human and robot actors responsible for picking items for the order. One or more processors of the exemplary management system 26 may be configured with software executable instructions tailored to cause order requirement information to be sent to the human and robot actors. The software executable instructions may be provided by way of an exemplary WMS or enterprise resource planning ("ERP") software application, in accordance with preferred embodiments of the present invention. Order requirement information sent to a robot actor by way of the order generator 58 may include a list of specific items from the order (including item names, and case names, if certain items are positioned in a case), required quantities of each item, and location information for each item (including case location, if applicable). Location information may include by way of example and not limitation, the identity of the storage rack where each item is located, and the location within the storage rack where each item is located. In certain instances, the order requirement information may include item volume and mass information, SKU, series number, some combination thereof, or the like. It will be apparent to one of ordinary skill in the art that order requirement information may include any number of different types of data, and any number of different formations and/or arrangements of data sufficient to inform product location and quantity to satisfy an order.

Generated orders in accordance with Block 1 may be communicated to an order picking executor 60 (Block 2). The order picking executor 60 may include a plurality of modules responsible for regulating execution of the order picking process. A first module of Block 2 may include an order picking engine configured to communicate work orders to robot and human actors. Selection of robot and human actors for work orders may involve consideration of any number of different factors by the management system 26, including by way of example and not limitation, actor availability, actor proximity to relevant items, human actor work schedule (e.g., the order picking executor 60 may be configured to avoid sending work orders to human actors scheduled to leave the warehouse shortly), robot power availability, current actor workload, some combination thereof, or the like. The location of pickers may be tracked by way of one or more scanners, ring scanners, RFID scanners, some combination thereof, or the like. The aforementioned devices may also be employed to confirm actions of the pickers.

A second module of Block 2 may include a scheduler configured to schedule at least one robot to handle each order in a particular time frame, and schedule certain human pickers to provide each item for each order in progress. Optimization algorithms of the second module may be configured to determine when certain orders should be handled by the actors, and in how much time said orders should be handled. An exemplary optimization function may consider the number of items in an order, actor proximity to the relevant items, location of relevant items in the warehouse, some combination thereof, or the like, such as to, by way of example and not limitation, estimate how much time will be required for the order to be fulfilled. By tracking how much estimated time is required for certain orders to be fulfilled, the second module may generate optimal schedules for robots and human pickers. Order priority requirements and delivery time frame requirements of relevant items may also be factors considered in scheduling activity of robots and pickers according to an exemplary optimization module.

A third module of Block 2 may include a location manager configured to track the location of each robot active in the management system 26 at any given time. The location manager may track the location of each robot by way of global positioning devices (GPSs), cameras, radiofrequency (RF) devices, other sensors, some combination thereof, or the like. Robot location information may be communicated from the third module to the first and/or second modules to help the management system 26 determine which robots should be selected for work orders and scheduled accordingly to promote efficiency. Furthermore, the location manager may utilize robot location information to manage resources used by multiple robots. By way of example and not limitation, the location manager may include a queueing manager directing robots to form queues when necessary to prevent disorganized robot clustering, collisions involving robots, some combination thereof, or the like. As a specific, non-limiting example, when multiple robots have been assigned to substantially the same picking position, the location manager may direct each of said multiple robots to queue proximate to one another near the picking position, but without contacting one another. Likewise, when multiple robots have been assigned to substantially the same empty pallet selection position, loaded pallet output position, printer station, some other warehouse station, or the like, the location manager may direct each of said multiple robots to queue proximate to one another near the relevant position or station, but without contacting one another.

When one robot in the queue closest to a target station or designated storage rack location completes its task, and thereafter is directed to move away from the queue, another robot in the queue initially second closest to the target station or designated storage rack location may reposition itself into the closest location of the aforementioned one robot. Likewise, another robot in the queue initially third closest to the target station or designated storage rack location may reposition itself into the second closest location after the initially second closest robot moves to the closest location, and so on. The aforementioned queue repositioning may be regulated by the queueing manager.

Referring to Block 3, a fleet manager 62 may be configured to permit commissioning, monitoring and control of a robotic fleet (e.g., 70, 72, 74) by one or more operators. Information from Blocks 1 and 2 (e.g., 58, 60) may be electronically communicated to Block 3 by way of one or more processors. The fleet manager 62 may be in electronic communication with robot fleet 70, 72, 74, such that an operator may regulate robot activity using the fleet manager 62. One or more interfaces may provide the option to direct work orders to a robot, regulate other activity of the robot, manage characteristics of robot assignments, manage robot coordination with one another and other aspects of the warehouse based on spatial and temporal characteristics, some combination thereof, or the like. Human operators may contribute to regulation of robot activity using the fleet manager, but such capability is not necessarily required.

The fleet manager 62 may comprise a software application executed by a central server, in communication with a communication device of each robot. The aforementioned application may enable, by way of example and not limitation, software tools for setting and managing robot projects, such as creating robot maps comprising robot route requirements and other relevant warehouse geospatial information. The application may be accessed by a human operator, such as by way of an HMI of a processor of the central server, a remote device interface, some combination thereof, or the like, wherein the human operator may edit aspects of the robot maps, assign rules regulating robot activity to the robot maps, and create "entities" on the robot maps (picking locations, parking positions, queueing positions, stations including by way of example and not limitation printing stations, charging positions, some combination thereof, or the like). The application may be configured to sync robot project and/or map information among each robot.

The fleet manager 62 may include monitoring tools that may be accessed by way of one or more interfaces, including by way of example and not limitation, an HMI of a processor of the central server, a remote device interface, a robot screen interface, some combination thereof, or the like. The monitoring tools may include a tool providing a live view of a robot map. The monitoring tools may include a tool providing a live view of a robot itself. The monitoring tools may include a tool providing a view of robot rules and regulations, and editing capability thereof. The monitoring tools may include a tool providing a view of robot diagnostic information, dashboards of robot operation data, and access to other analytical information relevant to robot operations. The fleet manager 62 may also include a module for regulating robot traffic ("traffic manager"). The traffic manager module may be implemented according to software instructions of one or more processors of a central server. The traffic manager may be configured to analyze geospatial information such as, by way of example and not limitation, intersections of robot routes, and provide traffic commands to the robots based on analyzed geospatial information. By way of example and not limitation, where two robots are approaching one another proximate to an intersection in robot routes, the traffic manager may direct at least one of the robots to stop, wait or move with respect to the intersection so as to avoid a collision between the robots. The traffic manager may also be configured to regulate the number of vehicles permitted in particular regions of a warehouse. For example, a warehouse may be divided into N vehicle zones, and each zone may be limited to a maximum number of N vehicles therein at any given time. When the maximum number N is reached for a particular zone, robots and/or human pickers outside that zone may be instructed to temporarily refrain from entering that zone.

Referring to Blocks 4-6, pickers may be provided with smart devices 64, 66, 68 configured to communicate to the picker what the pickers work orders are, as well as the appropriate sequence of the work orders. A smart device may include by way of example and not limitation, a smartphone, a wristband computer, a voice system, some combination thereof, or any other electronic device adapted to electronically communicate with one or more central servers executing operation of the management system 26. An interface of the smart device (e.g., 64, 66, 68) may be configured to display the next picking action required by the picker, including information about where required items are located for fulfilling an order, and information about what quantities of each item are needed to fulfill the order. The device may further be configured to display information about where items required to replenish storage racks may be located for inventory management. An exemplary WMS or ERP software application in accordance with an exemplary management system 26 may permit the display of work orders and inventory management information on the smart device. A human picker may be required to log in to the application before using the smart device to display work orders and inventory management information, and may further be required to log out of the application when the smart device is no longer being used to display work orders and inventory management information.

The exemplary application may further permit the smart device interface to display a confirmation message pertaining to a required quantity of a particular item, wherein the picker is asked to confirm that a certain required amount of a particular item has been placed on or in a pallet/container. The exemplary application may also provide a picker with the option to use the smart device to elect to skip a proposed work order, submit to the management system 26 that not all items from an order are available at a designated location, elect to consolidate multiple orders into the same container or pallet, request a new container or pallet, some combination thereof, or the like. By way of example and not limitation, items for orders from multiple customers may be directed to be loaded onto the same container or pallet. The management system 26 may activate indicators on a robot platform, a robot HMI, a picker smart device, some combination thereof, or the like to dictate to pickers where on a robot platform to load designated items and/or cases therefor.

Referring to Blocks 7-9, robots 70, 72, 74 are fully autonomous in this particular embodiment (capable of movement without direct actuation by a human operator). Autonomous mobile robots ("AMRs") (e.g., 70, 72, 74) may be programmed to autonomously retrieve an empty container or pallet after each previous work order is completed. The robots 70, 72, 74 may further be programmed to autonomously drive between picking locations, printing stations, outbound areas, some combination thereof, or the like, queue when necessary, and remain stationary when necessary. One or more processors of the exemplary management system 26 may be configured with software executable instructions to perform certain electronic operations of any aforementioned block. Furthermore, one or more processors of the exemplary management system 26 may be configured with software executable instructions tailored to permit electronic communication between the various blocks and modules thereof, as applicable.

In addition, the management system 26 may be configured to track the exact number of pickers available, wherein pickers who are logged out during a break or at the end of a workday may not be considered available to perform picking tasks. The management system 26 may further be configured to cease directing operations when there are no pickers logged in to an application in accordance with the management system 26. The system 26 may further track robots 70, 72, 74 by way of the robots 70, 72, 74 being logged into an application of the system 26 through a log in interface. At any given time, the management system 26 may be aware of the exact number of robots available for executing work orders. When a robot is removed from the system 26, such as by way of example and not limitation, when a functioning error or fault occurs (which may be reported autonomously or by a human operator, such as through a smart device), or when power requirements are not met, the management system 26 may delegate remaining robot tasks exclusively to other robots who are functional.

Each robot 70, 72, 72 may include one or more sensors, a processor, and autonomy stack software modules permitting the robot to execute actions without direct actuation by a human operator. The autonomy stack software modules may permit a robot to autonomously position a loaded container at a station accepting multiple loaded containers, move to a parked position (whether predefined or dynamically assigned), move to a charging station, some combination thereof, or the like. The robot may be equipped with a user interface/HMI adapted to communicate information to human warehouse workers. The user interface/HMI may communicate pending robot actions, designated locations for pending robot actions, designated items for picking, quantity of items for picking, images of items for picking, fault status if applicable, location of other nearby robots, power availability status, diagnostics information, some combination thereof, or the like.

Each robot may further be equipped with light and sound indicators corresponding to robot actions. A light and/or sound signal may be issued by a stationary robot to indicate one or more pickers that the robot is ready to receive items from a storage rack location in close proximity thereto. Light and/or sound signals may also be issued by a robot to indicate that the robot is waiting in a queue for a resource, waiting for another robot to pass by, requires maintenance, has low battery power, some combination thereof, or the like. It will be apparent to one of ordinary skill in the art that there may be any number of methods or devices available for indicating robot actions without departing from the scope of the present invention. It will further be apparent to one of ordinary skill in the art that exemplary robots are not necessarily limited to performing the above-mentioned tasks. For example, exemplary robots may also be configured to receive inbound goods and transport inbound goods to designated storage rack locations, engage in loading and unloading operations (e.g., unloading a trailer at a warehouse unloading dock; loading a trailer at a warehouse loading dock), replenish storage racks according to inventory management requirements, some combination thereof, or the like. It will be apparent to one of ordinary skill in the art that any movement of an exemplary robot described or referenced herein may occur autonomously.

All actions implemented by the management system 26 may be communicated by one or more system interfaces. For example, system interfaces may communicate which orders are in progress, which items and/or cases have been picked, which orders have been fulfilled, which pallets, containers, cases, items, some combination thereof, or the like have been delivered to a destination, which robots have performed particular actions, which pickers have performed particular actions, some combination thereof, or the like.

Referring back to FIG. 3, an optimization layer 44 or module may be configured to optimize the sequence of orders to be executed ("order shuffling"), items and/or cases to be picked within each order, and pickers assigned to each order. The optimization layer 44 framework may be implemented according to software instructions of one or more central processors. When a sequence of orders to be executed is determined, along with items and/or cases to be picked within each order, order assignments may be scheduled accordingly. A favorability rating or score may be assigned to each available robot, and the robot with the highest favorability rating or score may be directed to handle the next scheduled order assignment. The favorability rating or score of each robot may be determined according to evaluation of a plurality of criteria, including by way of example and not limitation, whether the robot has an empty container or pallet available (and if not, estimated time before the robot will have an empty container or pallet may be communicated), the distance between the robot and the first item in the order to be picked, confirmation (or lack thereof) of proper robot functioning, robot battery status, some combination thereof, or the like. Information pertaining to the aforementioned criteria may be communicated from the robots to the processor(s) executing the optimization layer framework. The optimization module may communicate the next scheduled order assignment directly to a robot, and if the robot is not engaged in another task at that time, the robot may immediately proceed with handling said next scheduled order.

A robot having retrieved an empty pallet may be directed by the optimization module to move to a designated storage rack location for item/case picking. After the robot arrives at the designated storage rack location, a picker may be notified (e.g., through a software application of a smart device) that a robot is ready for the picker to load items on it. In certain cases, however, a picker 28 may be directed to a designated storage rack location before a robot 30 arrives. Items and/or cases therefor designated for picking may be scanned (e.g., by barcode, RFID tag, some combination thereof, or the like) or otherwise identified (e.g., by marker, control number, some combination thereof, or the like) by the picker 28, and registered by the picker to the management system 26 to confirm that the items and/or cases therefor have been removed from the storage racks and loaded onto a robot platform.

The picker 28 may also communicate to the management system 26 the identity of the robot 30 having been loaded with the items and/or cases. The aforementioned identification may occur by way of barcode scanning, confirming a marker or control number, scanning an RFID tag, scanning a QR code, some combination thereof, or the like using an exemplary management system 26 software application on the smart device. The picker may also confirm the quantity of items and/or cases therefor picked to the management system 26, such as by way of the smart device software application, an HMI on the robot, some combination thereof, or the like. It will be apparent to one of ordinary skill in the art that there may be any number of different methods or devices available for confirming robot identities and product orders and quantities without departing from the scope of the present invention. It will also be apparent to one of ordinary skill in the art that although warehouses are described herein as comprising storage racks for clarity purposes, storage racks are not necessarily required, and virtually any assortment of goods in a warehouse may be employed without departing from the scope of the present invention.

Referring to FIGS. 3 and 4, an exemplary optimization layer 44 framework may permit the order picking executor 60 to schedule and allocate work orders. After part of an order is fulfilled by having items and/or cases therefor loaded onto a robot platform, the robot 30 may be directed to move 48 to a subsequent location for loading additional items and/or cases therefor. The picker 28 assigned to load items and/or cases at the subsequent location may be the same picker from the previous location or a new picker, depending on what the management system 26 determines is optimal for fulfilling the order in view of schedule requirements. Where items and/or cases therefor are not available in sufficient quantities to fulfill an order in its entirety, the picker 28 may still place the available quantities on the robot platform and report to the system the quantity selected and/or the quantity unavailable. A robot may be directed to return to a location where sufficient quantities of an item to fulfill an order were initially unavailable after the last item of the order is picked. At said location, the robot may await restocking of inventory (e.g., warehouse actors may be directed by the management system 26 to restock depleted storage racks) so that the order may be fulfilled in its entirety, but such is not required. A robot may also merely deliver containers/pallets with currently available items and/or cases therefor.

A picker 28 may in some scenarios determine that there is insufficient space on a robot platform for subsequent loading of items and/or cases therefor. In such scenarios, the picker 28 may report to the management system 26 that a robot platform is full. The system 26 may thereafter direct the robot 30 to move to a printer station to obtain a label for the picked goods, and/or to move to an output station to deliver the picked goods away from the warehouse. In certain embodiments, new orders may be assigned for items and/or cases therefor that were not loaded onto a robot assigned the initial order because, e.g., the robot platform became full during the initial order. Said new order may be fulfilled by the same robot which handled the initial order, or a different robot, depending on whichever robot is optimal for fulfilling the order in view of scheduling requirements.

It will be apparent to one of ordinary skill in the art that exemplary management systems are not necessarily limited to internal processors with respect to a single warehouse. For example, internal processors may report certain information to an external system, and an external system may generate new orders and send the new orders to one or more internal processors of a particular warehouse. Furthermore, embodiments of an exemplary warehouse management system may be implemented in any number of different warehouses without departing from the scope of the present invention.

In certain exemplary embodiments, when all items from an order have been loaded onto a pallet, the management system 26 issues a command to the robot 30 to obtain a printed label for the pallet and then deliver the pallet to an outbound area. The outbound area may include stretch wrapping machines adapted to position stretch wrap around the pallet and items thereon. Where a robot is unable to complete an order (e.g., a fault is detected), the management system 26 may be configured to issue a new order to a functioning robot designating remaining items and/or cases therefor to be picked. One or more internal processors of the management system 26 may be configured to submit information about faulted robots to an external system directing fulfillment activity. A functioning robot may be directed to retrieve picked items and/or cases from a nonfunctioning robot. Alternatively or additionally, the external system may generate a task for a forklift operator to reposition items and/or cases on a platform of a nonfunctioning robot to a target station. It will be apparent to one of ordinary skill in the art that there may be any number of different devices or methods available for troubleshooting robot movement issues without departing from the scope of the present invention.

FIGS. 5-10 generally depict exemplary picking activity 76, including interaction between robots and human pickers at picking locations 78 across a warehouse having a plurality of storage racks 32. These particular figures are merely illustrative of certain exemplary picking on a small scale, and are in no way meant to be exhaustive, especially in view of the fact that picking generally occurs on a much larger scale.

Figure 5:
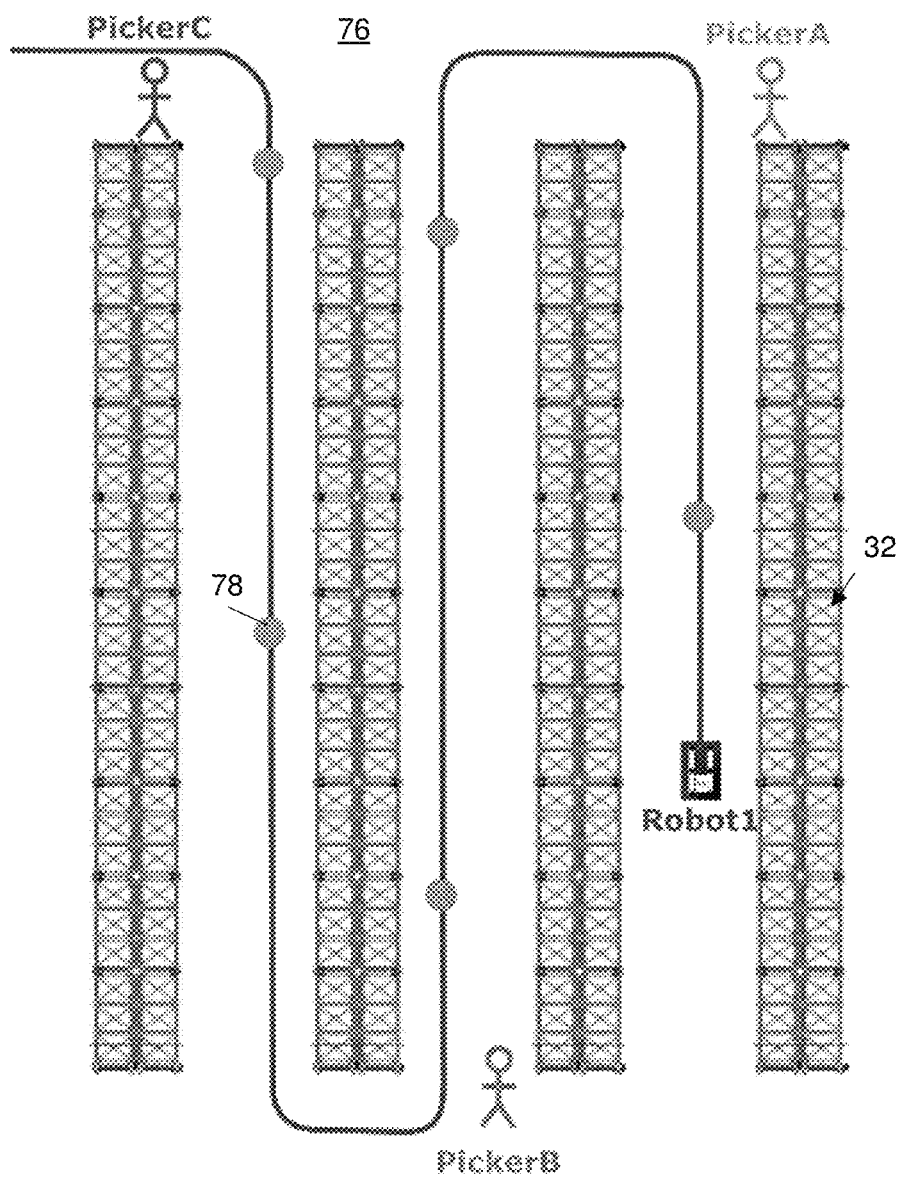
FIG. 5 illustrates exemplary robot picking activity in a warehouse environment.
Figure 6:
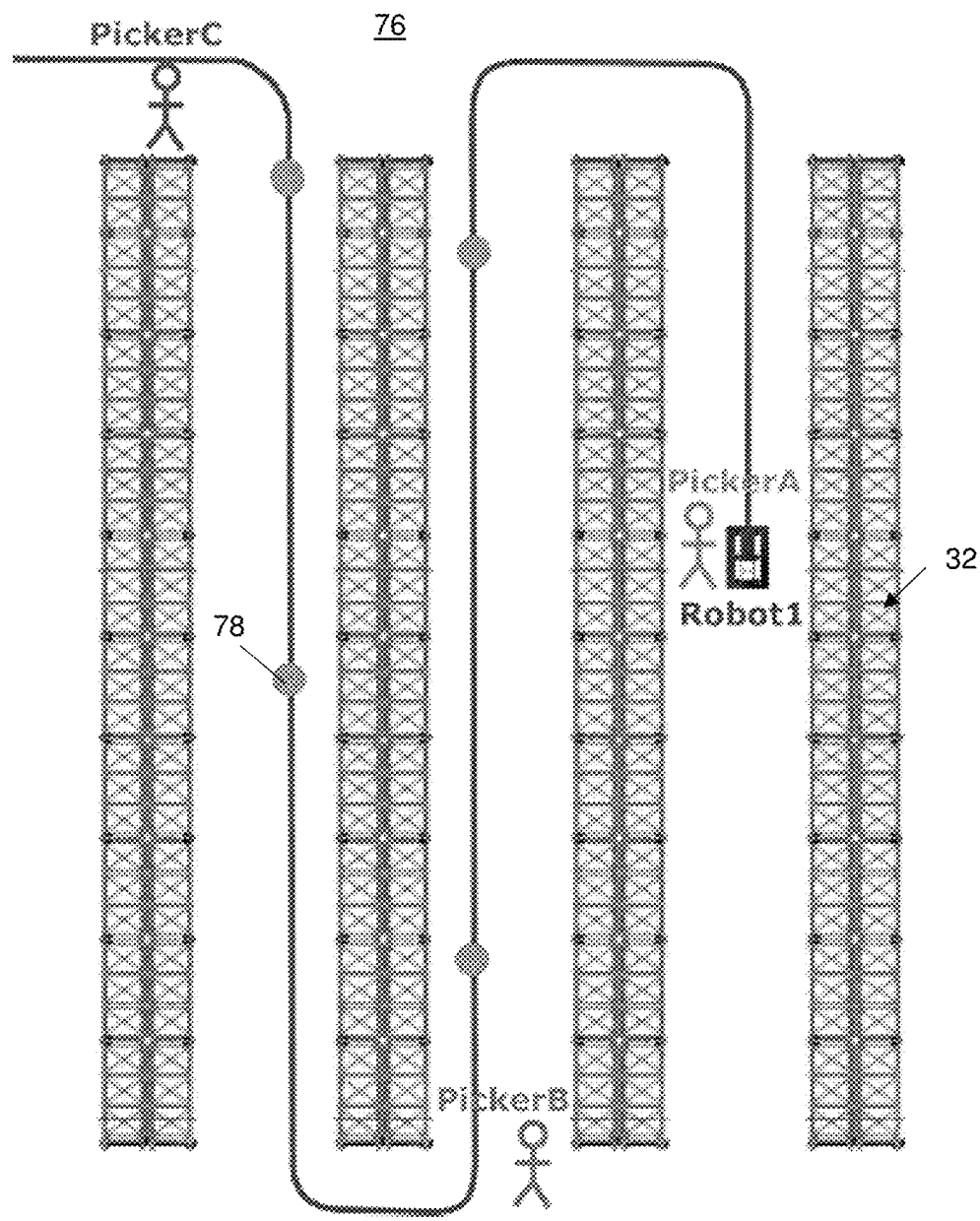
FIG. 6 illustrates other exemplary robot picking activity in a warehouse environment.
Figure 7:
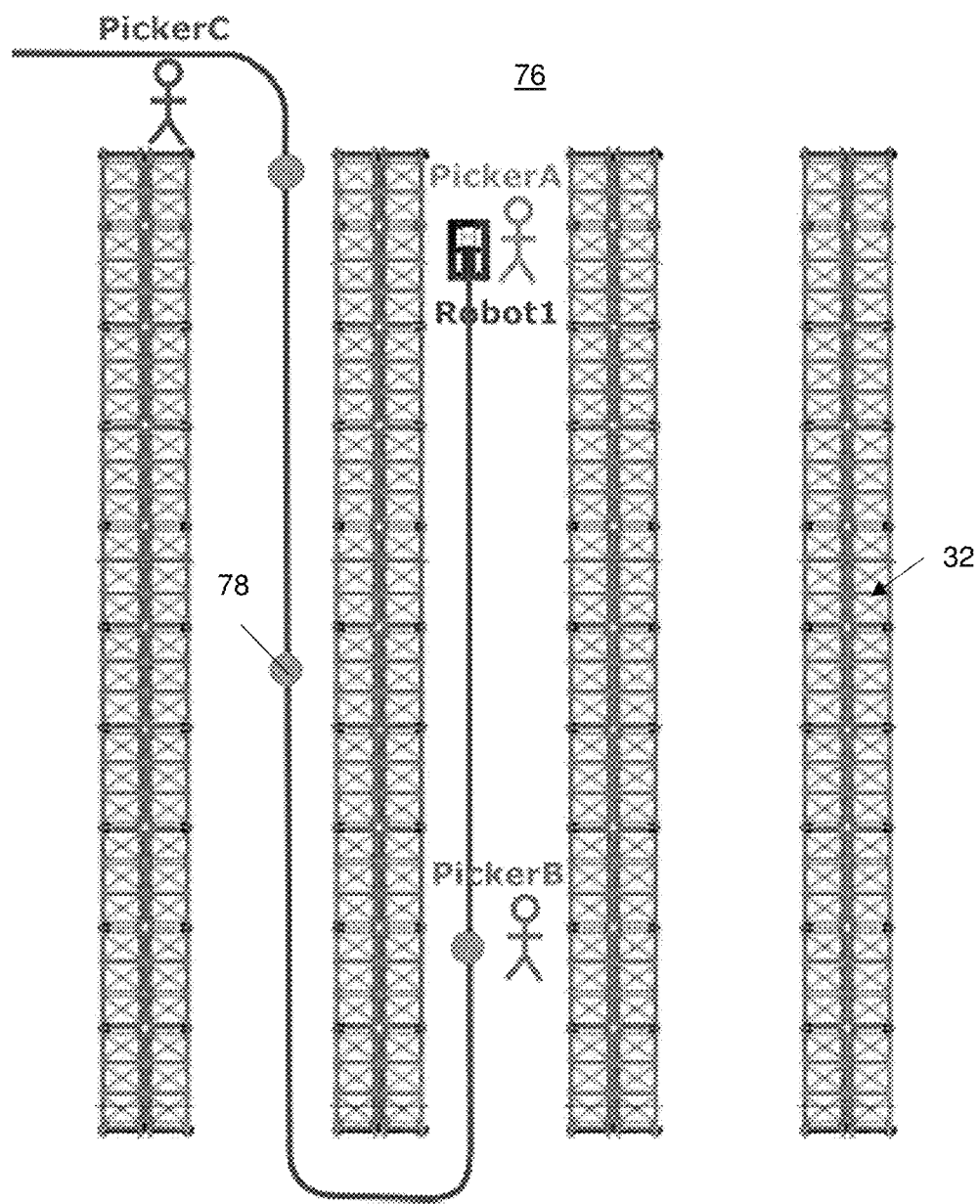
FIG. 7 illustrates yet other exemplary robot picking activity in a warehouse environment.
Figure 8:
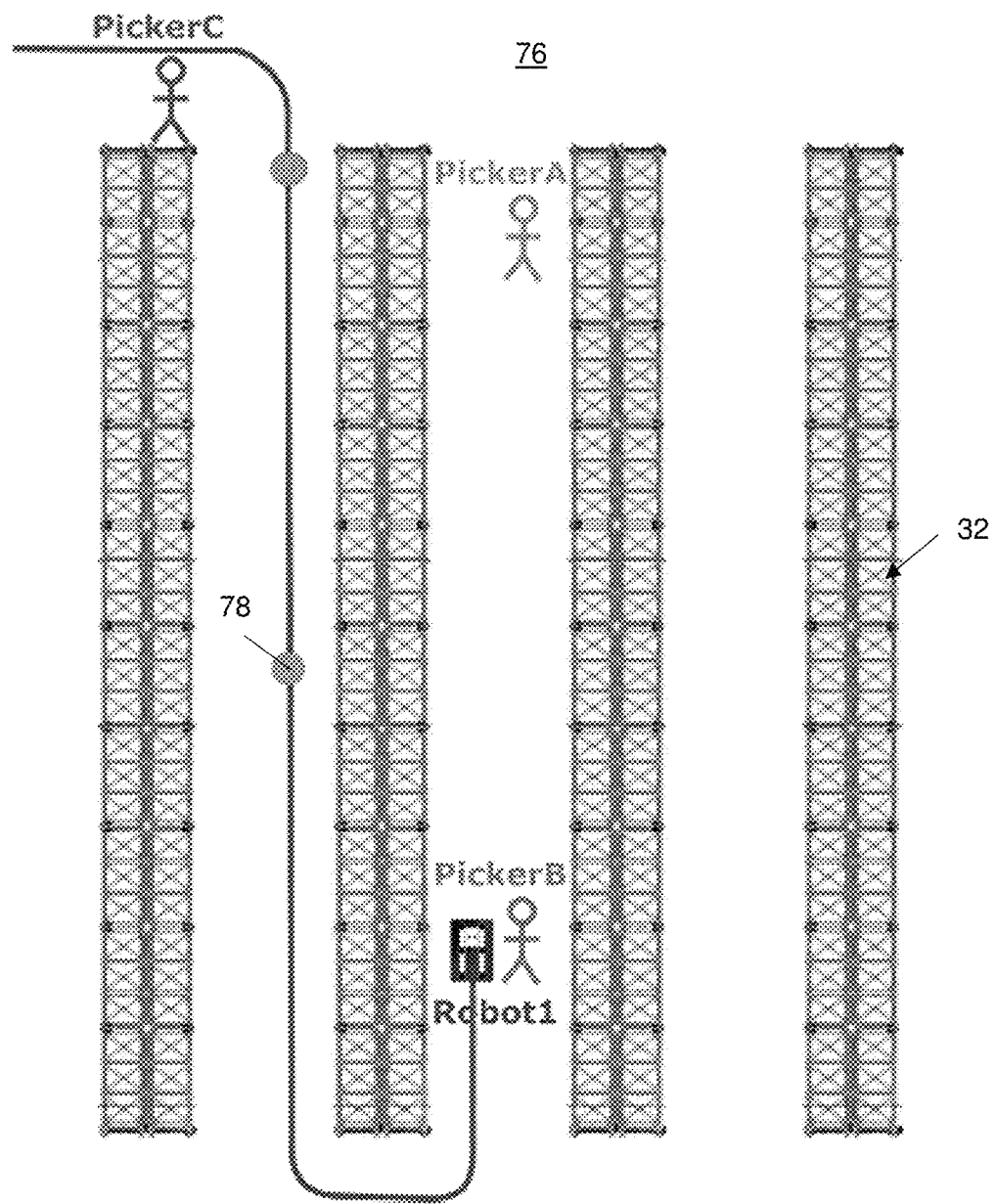
FIG. 8 illustrates yet other exemplary robot picking activity in a warehouse environment.
Figure 9:
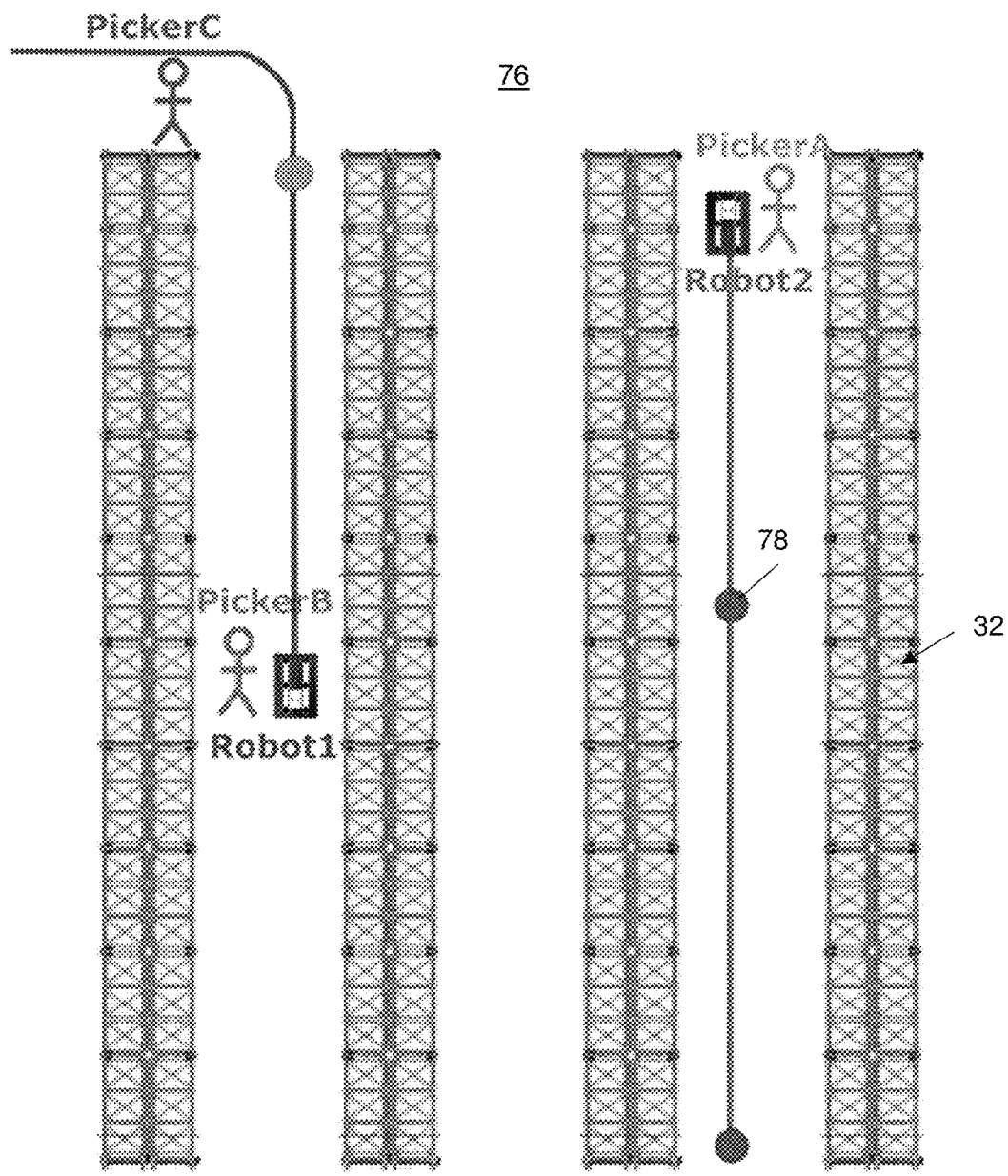
FIG. 9 illustrates yet other exemplary robot picking activity in a warehouse environment.
Figure 10:
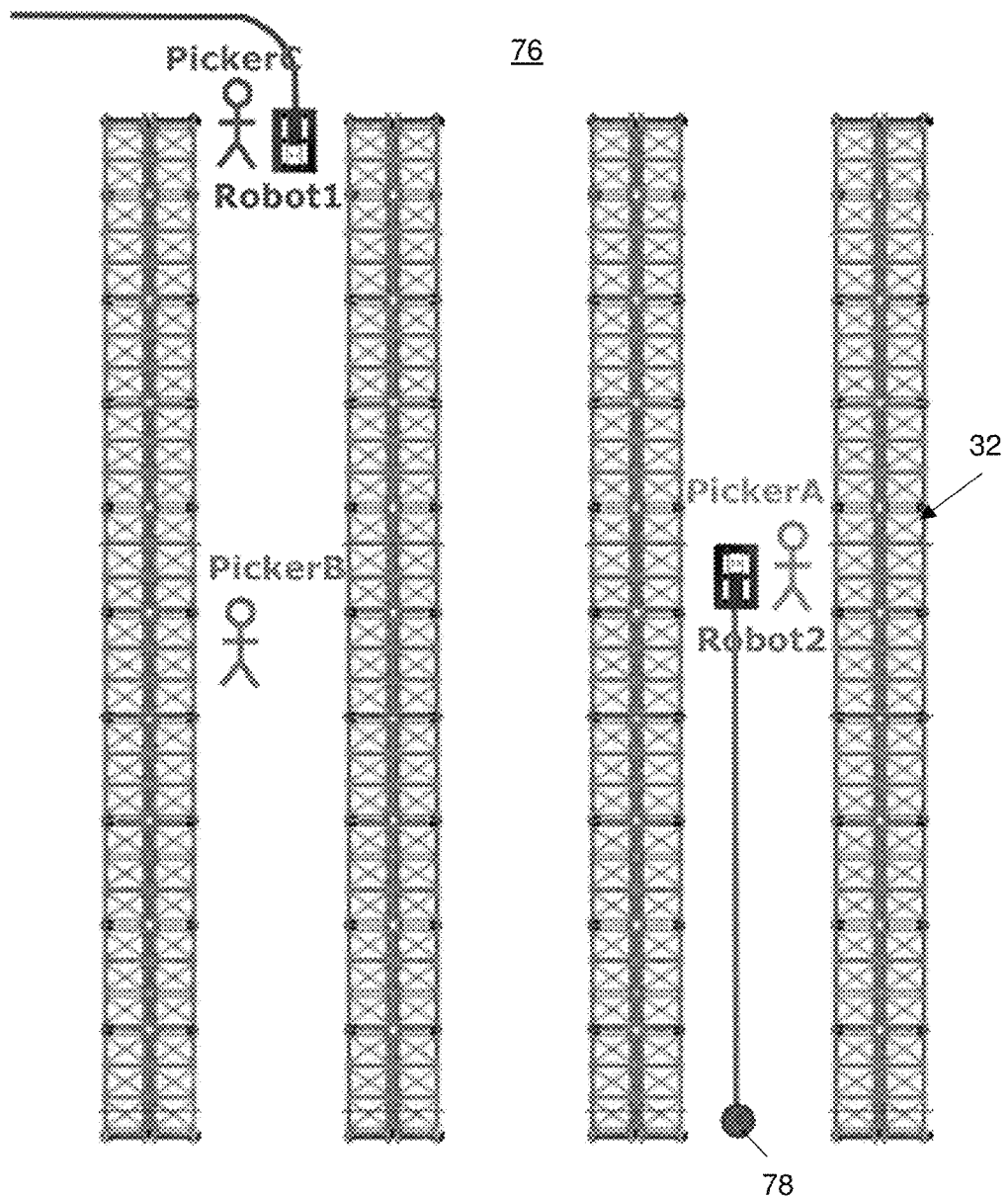
FIG. 10 illustrates yet other exemplary robot picking activity in a warehouse environment.

Referring now to FIG. 5, Robot 1 is directed to the next item location among multiple item locations 78 between storage racks 32. Picker A is notified by the management system to go to the location of Robot 1. Referring now to FIG. 6, Picker A is directed to place items from the storage rack 32 onto a pallet of Robot 1 at a specific location among multiple item locations 78. Picker A and Robot 1 are then commanded to move to the next location. Referring now to FIG. 7, Picker A is directed to place items into the container/pallet of Robot 1 at this second item location. Thereafter, Robot 1 is commanded to go to a third item location where Picker B is already waiting. Referring now to FIG. 8, Picker B is directed to place items into the container/pallet of Robot 1 at this third item location. Robot 1 and Picker B are then commanded to travel to a same next location. Referring now to FIG. 9, Robot 2 and Picker A are directed to go to an item location. Meanwhile, Picker B is directed to place items into the container/pallet of Robot 1. Picker A is then directed to place items into the container/pallet of Robot 2. Referring now to FIG. 10, Picker C is directed to place items into the container/pallet of Robot 1 at a subsequent picking location. Meanwhile, Picker A is directed to place items into the container/pallet of Robot 2 at a subsequent picking location.

An exemplary objective of the optimization module is to minimize time required to complete orders. Another exemplary objective of the optimization module is to reduce the aggregated distance humans are required to travel to reach items assigned to them. Referring back to FIG. 3, the optimization layer 44 may be configured to direct order shuffling and picker-to-line association. Order shuffling may focus on sequencing orders (e.g., provided by WMS forwarding orders 12) for achieving the aforementioned exemplary objectives, and picker-to-line association may focus on sequencing lines within the orders, and assigning pickers to particular lines for achieving the aforementioned exemplary objectives. Optimization may require addressing new orders as they appear, and relevant information for optimization may include subsets of available orders, subsets of available items, subsets of available robots, and subsets of available human pickers. Factors such as worker breaks, robot malfunctions, power outages, other anticipated obstacles, some combination thereof, or the like may also be accounted for. Optimization may include several phases for order shuffling and picker-to-line association.

Figure 11:
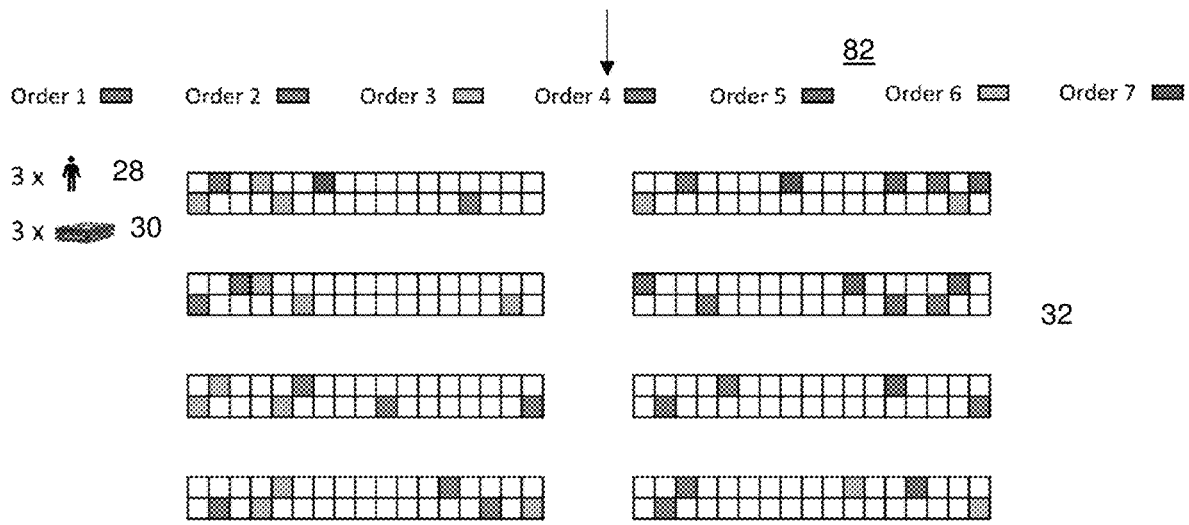
FIG. 11 illustrates exemplary logic for directing robot picking activity in a warehouse environment.

Referring now to FIG. 11, an exemplary algorithm 80 for achieving exemplary order shuffling is shown. The aforementioned algorithm may be executed according to software instructions of one or more processors for an exemplary system for picking activity in a warehouse environment. In this particular embodiment, orders may be sorted by applying a hierarchical clustering technique. Similarity between multiple orders may be measured, accounting for location of each item and distances between each item. Distances between items may follow a path planning strategy focused on minimizing required robot travel. Exemplary algorithms may be configured to minimize distance matrices, and to minimize differences in order sizes after comparing multiple orders. Multiple orders having similar item locations and similar sizes may be prioritized, and handled in unison.

In the FIG. 11 embodiment, a set of open orders act as input data to the exemplary algorithm 80. A clustering technique may yield a set of orders to be processed in a subsequent iteration. The size of the set may be equal to the number of robots 30 in the system. Exemplary algorithms for clustering may also account for miscellaneous order requirements such as, by way of example and not limitation, order deadlines and assigned order priority. An order sorting mechanism 82 may include a number of available orders to enter in the management system. In this particular embodiment, seven orders are shown. In addition, three pickers 28 and three robots 30 are shown, wherein the pickers 28 and robots 30 are prepared to handle work orders. After the clustering mechanism chooses and sorts certain orders (e.g., shown at 82 of FIG. 11), the orders proceed to picker-to-line association.

Referring now to FIG. 12, an exemplary algorithm 84 describing the decision process for picker-to-line association is shown. The event e that may trigger rescheduling may be, by way of example and not limitation, order completion, picker availability, robot availability, time elapsed from a last reschedule exceeding a predefined time interval, some combination thereof, or the like. Referring now to FIGS. 11 and 12, in this particular embodiment, the clustering mechanism (e.g., 80, 82) has elected three of seven orders to be sorted. Referring again specifically to FIG. 12, three pickers (e.g., 28) and three robots await handling work orders. Additional clustering may be performed to divide items among the number of human workers ("clustering linkage"). The clustering linkage criteria may be adjusted as necessary to prevent significant discrepancies between the number of items assigned to one picker versus another. The sequence in which items assigned to a picker may be visited may be obtained by applying the Traveling Salesman Problem ("TSP") algorithm for minimizing picker movement in view of an exemplary path planning strategy. The TSP itself is known, but the aforementioned application of the TSP is novel.

Three clusters 86 are illustrated in FIG. 12, wherein each cluster is assigned to one of three pickers 28. The picker 28 may be directed to move to the next item in closest proximity to the picker 28. Here, lighter shaded items illustrate completed items (i.e., items that have already been loaded onto a robot platform). Each robot may be configured to extract the sequence of items to be picked within each cluster. It is not necessarily required that the picker 28 proceed to pick each item, moving from the closest picking position to the next closest picking position. By way of example and not limitation, the picker may decide to take a break, leave the system, some combination thereof, or the like. In the aforementioned scenario where a picker becomes unavailable, the remaining pickers may be directed to adapt to cover the removed picker's picking positions.

Figure 13:
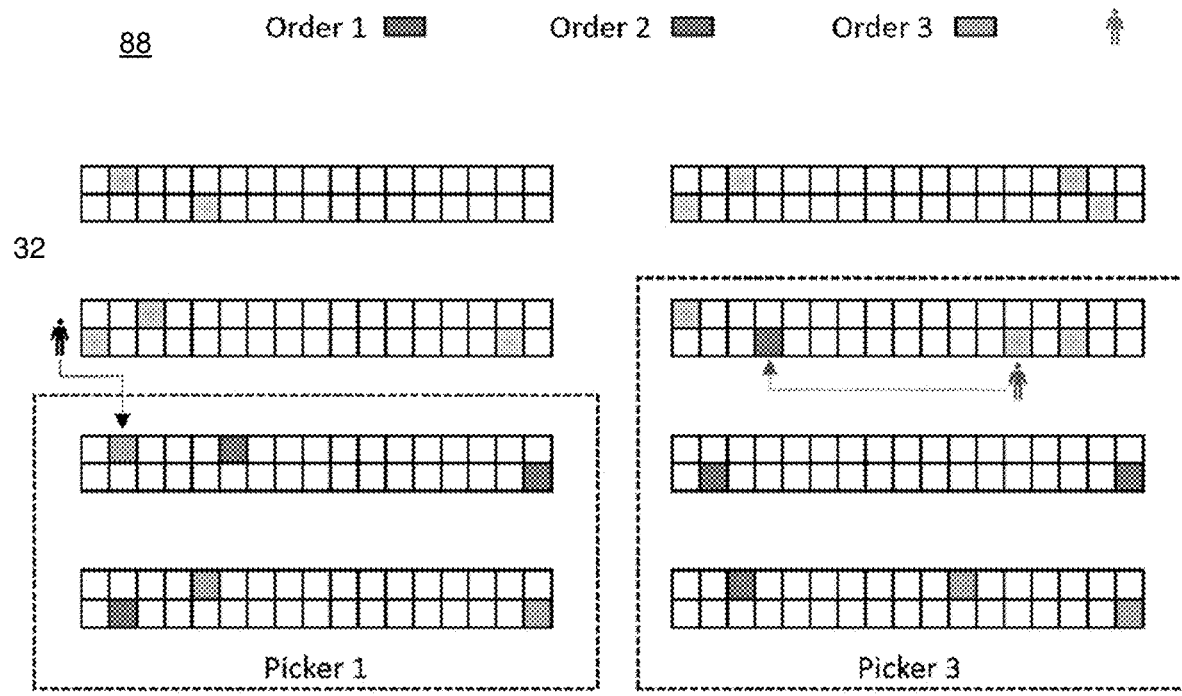
FIG. 13 illustrates yet other exemplary logic for directing robot picking activity in a warehouse environment.
Figure 14:
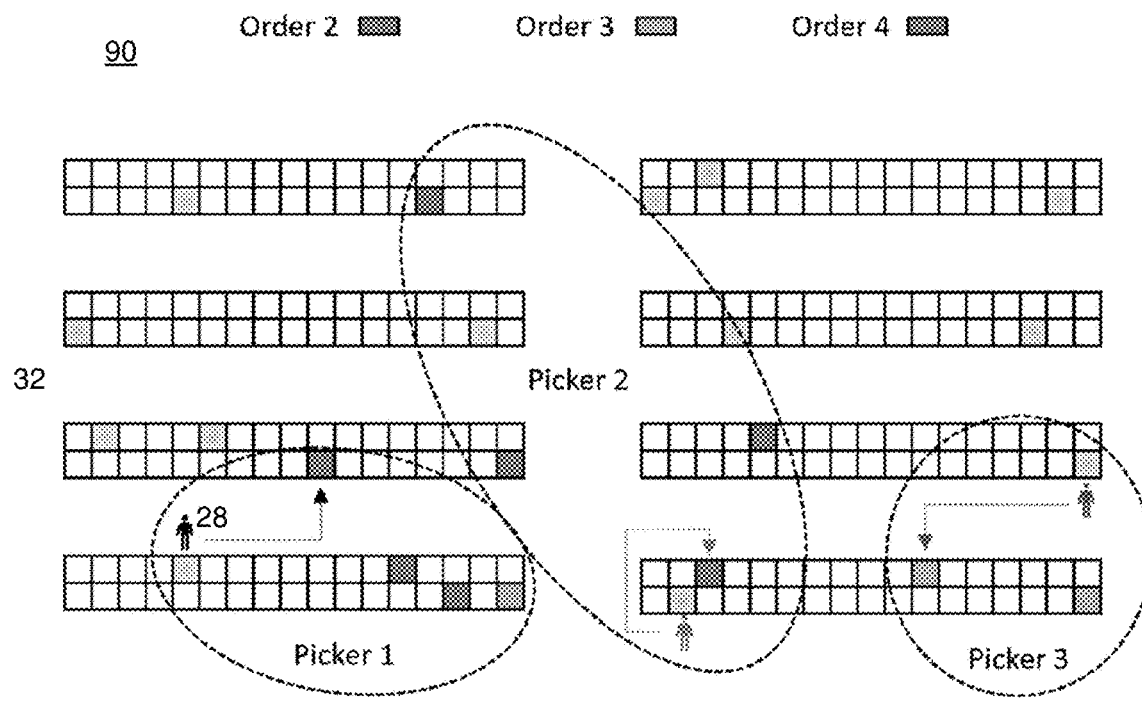
FIG. 14 illustrates yet other exemplary logic for directing robot picking activity in a warehouse environment.

FIGS. 13 and 14 illustrate exemplary adapting 88, 90 to cover a removed picker's picking positions. Referring specifically to FIG. 13, in a non-limiting example situation where Picker 2 is no longer available, the cluster may be modified and expanded such that all remaining items are directed to be handled by Pickers 1 and 3, including the items originally assigned to Picker 2, but not yet picked by Picker 2. Referring now to FIG. 14, cluster visiting sequences (e.g., 90) may be defined for each robot, such as to, by way of example and not limitation, avoid having too many robots visiting too few clusters. The aforementioned scenario may result in disproportionate workloads amongst different pickers. Thus, in the FIG. 14 embodiment, when one robot completes its order, the clustering mechanism forwards a next order to the robot determined to be most similar to the robot's set of open/pending orders. Here, Order 4 enters the system 90 after Order 1 is completed. Picker 2 returns to the system 90, and the system 90 now divides items from the three orders into three clusters. The clustering mechanism may be configured to recompute clusters when a picker completes a task before other pickers, so as to not keep any picker idle.

It will be apparent to one of ordinary skill in the art that an exemplary system and method for directing robot and picker activity in a warehouse environment is not necessarily intended to be limited to the variables, considerations and constraints discussed above. Any and all relevant factors and constraints in the inventory management and order fulfillment processes may be considered in preferred embodiments. Other considerations include by way of example and not limitation, whether a customer has defined a sequence in which items should be picked (e.g., due to item weight, dimensions, durability, some combination thereof, or the like), whether strict deadlines must be met, whether unforeseen circumstances restrict normal operations, some combination thereof, or the like.

Referring now to FIGS. 15-16, an exemplary system and method for organizing communication between humans and robots in a warehouse environment is intended to promote workflow efficiency. After each picker logs in or out of a warehouse management system application, arrives at a picking destination, places items and/or cases therefor on a robot platform 104, some combination thereof, or the like, a confirmation of the picker's action may be registered with the warehouse management system. Furthermore, a notification or confirmation of the action may be issued to each robot 30 in a robotic fleet. After each robot 30 drives to a resource, idles in preparation of a picker coming to pick items and place said items on a robot platform 104, queues for a resource, stops to wait for an obstruction in its pathway to be resolved, idles to yield to another robot moving in its pathway, becomes in a fault state, some combination thereof, or the like, a confirmation of the robot's action and/or status may be registered with the warehouse management system. Furthermore, a notification or confirmation of the action may be issued to warehouse workers, external operators, some combination thereof, or the like.

Multi-modal communication channels may be implemented to permit information to be exchanged between pickers and robots 30. By way of example and not limitation, robots and pickers may each be provided with or equipped with smart devices. Smart devices may include, by way of example and not limitation, wearable computer devices such as smart watches or bands, generic smartphones, wrist-band smartphones, tablets, head-mounted display smart devices, some combination thereof, or the like. Each smart device may include a scanner. Each smart device may further include selective voice recognition. In the embodiments shown, each robot 30 includes a tablet-screen smart device 100A-B linked to the robot by a stem 105. Information may be displayed for a picker on the screen 100, and a picker may confirm its actions to the robot fleet by engaging an interface of the screen 100. The aforementioned interface may be an HMI.

The robots 30 may further be equipped with LED lights (e.g., 102A-E) or other like indicators adapted to be controlled by the autonomy stack of each robot. Additionally, each robot may be equipped with speakers permitting the robot autonomy stack to play custom sounds corresponding to robot status information. A plurality of wheels may be positioned at or near the bottom 108 of the robot 30, wherein the wheels may permit movement of the robot 30. Information exchanged between the robots 30 and the pickers may include, by way of example and not limitation, information about which aisles or locations the robot is designated to visit next (and sequence thereof if the robot is designated to visit multiple locations). The information may be displayed on the picker's smart device, on the robot's screen 100, pronounced through a headset worn by the picker, pronounced through robot speakers, some combination thereof, or the like. Robot speakers may be useful for communicating robot action and status information to pickers who are near the robot, but the view thereof is obstructed, such as by a storage rack separating the aisle the robot is in from the aisle the picker is in.

Information communicated from a picker to the robot fleet may include information about when the picker has arrived at a picking location and/or target station, identity and quantity of items picked, some combination thereof, or the like. The picker may use a scanner to scan a tag, including by way of example and not limitation, a barcode tag, a QR code tag, or the like, to designate a tagged item as picked. A picker's smart device may also be configured with a scanner interface to scan items. A picker may additionally or alternatively use a headset to communicate to the robot fleet that an item has been picked, such as by, for example not by way of limitation, communicating an identification number of the item to the robot fleet.

The robot screens 100 or monitors may be configured to display any important information about items designated for picking. The robot screens 100 or monitors may further be configured to display information about robot actions, diagnostics, power availability, some combination thereof, or the like. Robot action information may include by way of example and not limitation, information about completed orders, information about pending orders including items picked from a pending order and items awaiting picking from the pending order, estimated time required for pending work orders, required picker activity for the robot to complete a pending order, designated location on the robot platform for picked items to be placed, some combination thereof, or the like. Indicators (e.g., LED lights 102A-E) may communicate to pickers where specifically to place items. By way of example and not limitation, for restocking activity, indicators may direct warehouse workers to place items on a rack on a particular side relative to the robot 30.

As another non-limiting example, for picking activity, indicators may direct pickers to place items on a particular side of a robot platform 104. LED lights may illume between any number of different colors, each color corresponding to a particular robot status information, robot action information, picking requirements, some combination thereof, or the like. Indicators, including by way of example and not limitation LED lights, may be useful to pickers who are too far away from the robot 30 to view information on the robot's screen/monitor 100. As a non-limiting example, indicators may illume a first color when the robot is driving to a resource, a second color when the robot is in a queue for a resource, a third color when the robot is idle at a picking location and is ready for items to be positioned thereon, a fourth color when the robot has completed an order, and the like.

Referring specifically to FIG. 15, a first column 92 of the table illustrated therein shows robot display interfaces 96, 98 which may be viewed through a monitor/screen 100A-B. A second column 94 illustrates exemplary robots 30. Robot display interface information may include identification of the item required to be picked, the quantity of said item to be picked, the quantity of cases or other storage units thereof to be picked (if applicable), article number, information whether the robot is in a queue position or not, information about whether the robot is ready to receive picked items, information about where on the robot platform or pallet the item should be placed, some combination thereof, or the like. Referring specifically to FIG. 16, a first column 110 of the table illustrated therein shows robot status 114, 116, 118, and a second column shows LED indicators 102C-E illuming between various colors corresponding to robot status. In this particular embodiment, the LED lighting pattern is also varied between each corresponding robot status.

Figure 17:
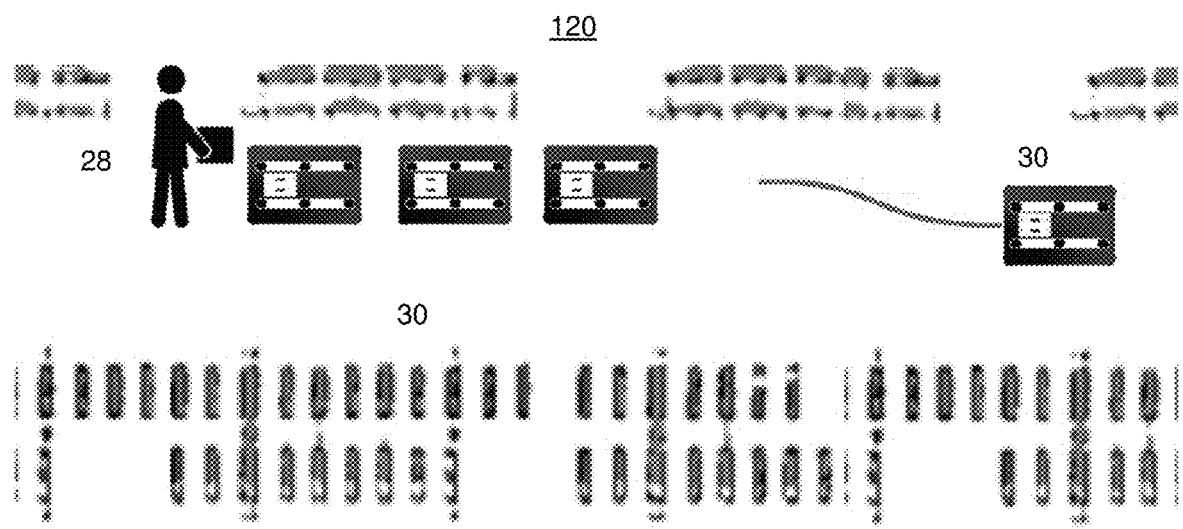
FIG. 17 illustrates queueing robots in a warehouse environment based on workflow optimization instructions in accordance with an exemplary embodiment of the present invention.
Figure 18:
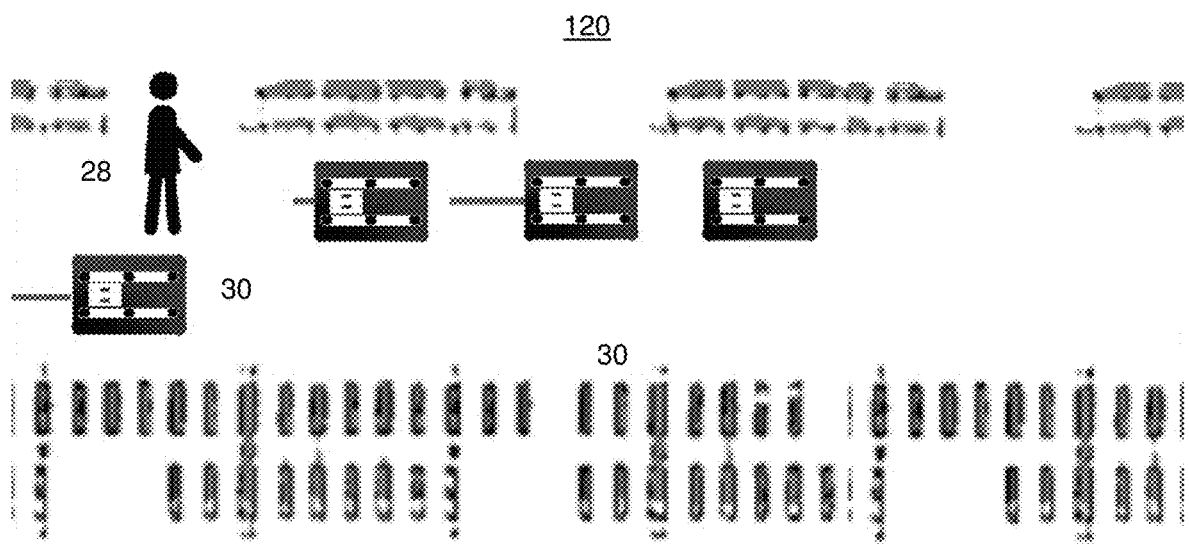
FIG. 18 further illustrates queueing robots in a warehouse environment based on workflow optimization instructions in accordance with an exemplary embodiment of the present invention.
Figure 19:
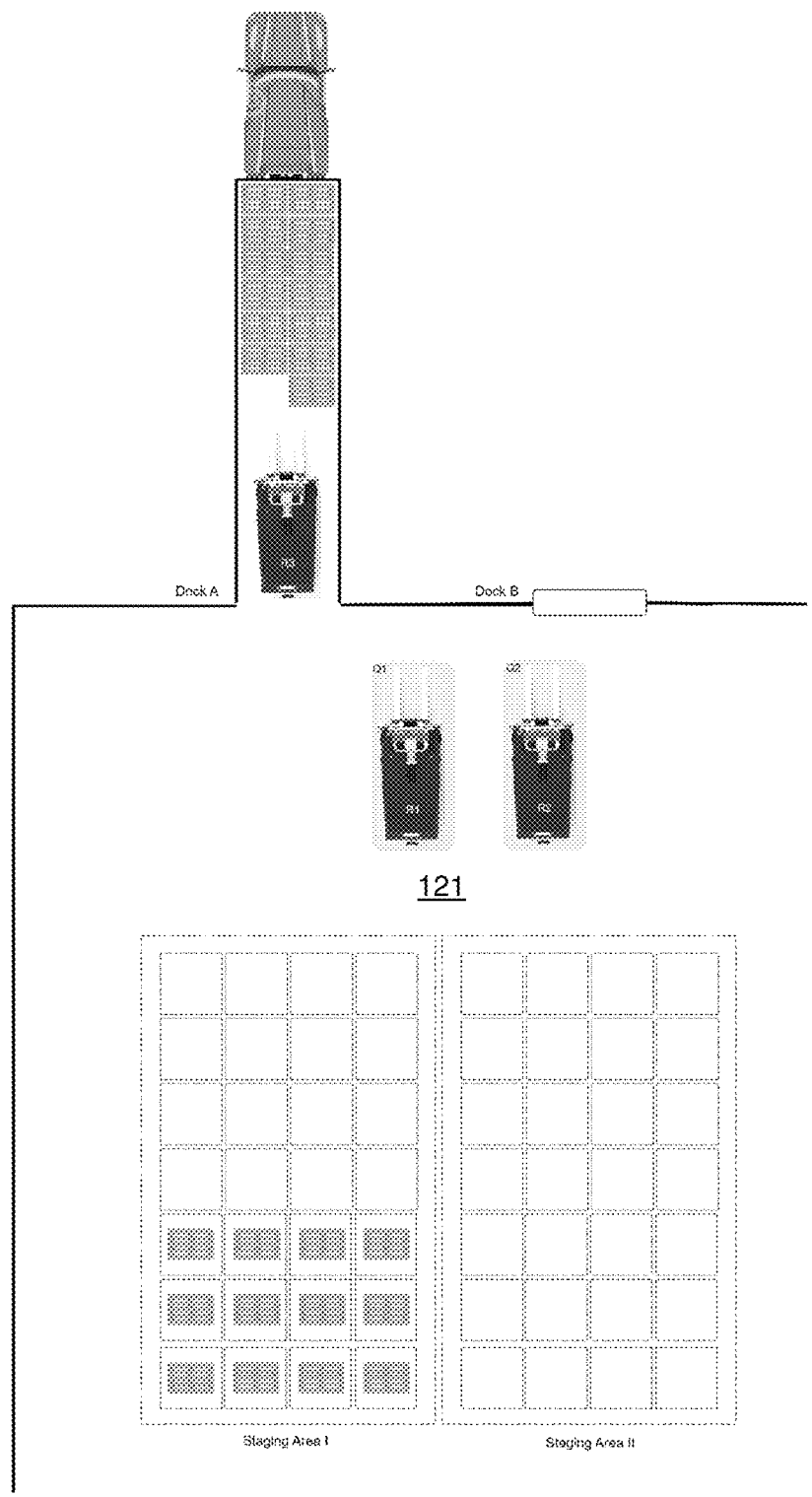
FIG. 19 further illustrates queueing robots in a warehouse environment based on workflow optimization instructions in accordance with another exemplary embodiment of the present invention.

Referring now to FIGS. 17-19, robots 30 are shown queuing (also referred to herein as "swarming") in a warehouse environment 120 based on workflow optimization instructions. The robots 30 may be permitted to form queues at any location across the warehouse environment, wherein for each scenario where multiple robots have been assigned to substantially the same general designated storage rack area, staging area (e.g., 121), trailer dock area, target station, or other warehouse location, each robot is assigned to a specific location proximate to the other robots but not contacting the other robots. Consequently, in some embodiments, pickers may pick cases/items onto various robots at a single queuing location without having to wait for subsequently arriving robots, or without having to spend time walking to farther away robots. In certain other embodiments, two or more robots loading or unloading pallets in the same trailer may increase their efficiency by waiting on queue positions next to a trailer dock location while another robot is operating within the trailer. The swarming mechanism of FIGS. 17-19 may be implemented at any location across the warehouse.

Figure 20:
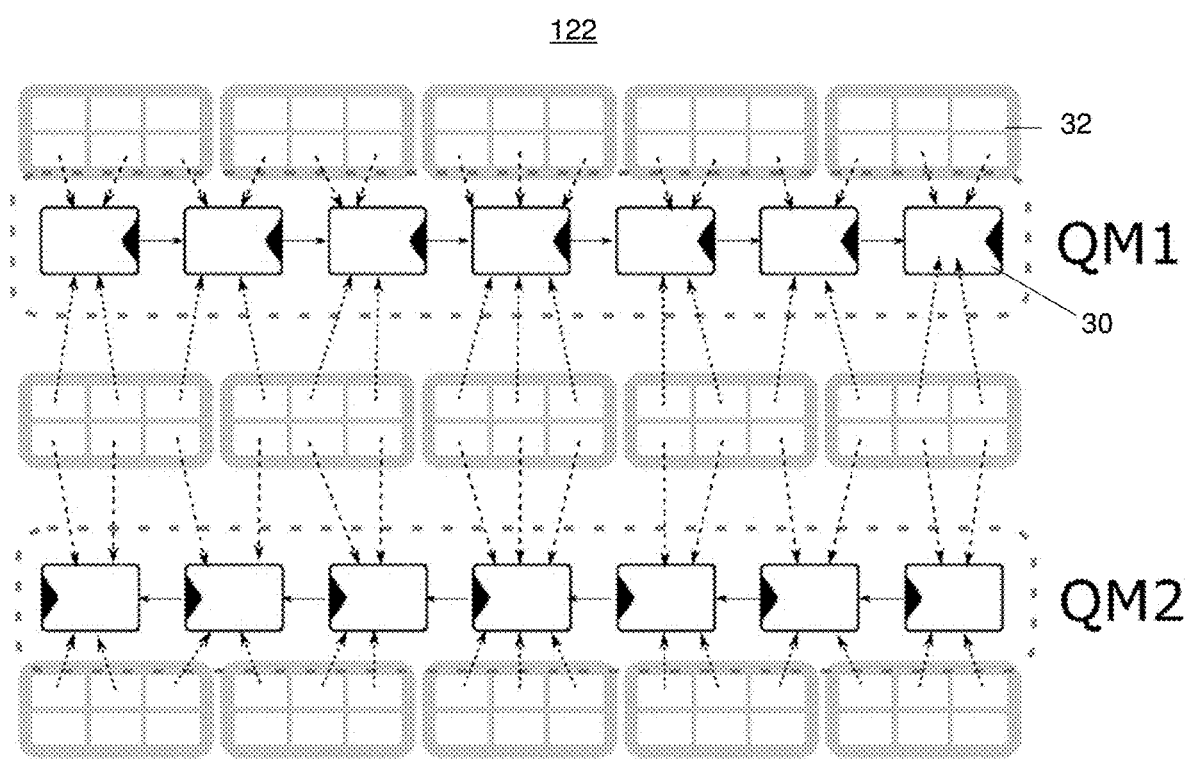
FIG. 20 illustrates other queueing robots in a warehouse environment based on workflow optimization instructions in accordance with an exemplary embodiment of the present invention.

FIG. 20 illustrates exemplary queues of robots 30 across two aisles of a warehouse 122, wherein each aisle is separated from one another by storage racks 32. In each aisle, a queuing manager QM1, QM2 manages which robots are assigned to which location within the aisle. In this particular embodiment, multiple item locations are assigned (illustrated by dashed arrows) to like queuing locations. A framework for the queuing managers may be executed according to software instructions of one or more central processors of an exemplary warehouse management system. With respect to each aisle of the warehouse 122, a list of queuing positions for robots to park in while awaiting some activity (e.g., picking, loading, unloading, or the like) related to a resource (e.g., item position, pallet position, trailer dock position, or the like) and/or queue repositioning may be provided by the management system to the robots. A resource position (general location of resource related to robot activity) (e.g., a portion of a storage rack, a portion of a staging area, a trailer dock, or the like) may be linked to a queuing position (e.g., a portion of an aisle floor) during project setup (referred to herein as a "static link"). Where no static links are assigned, the management system may automatically link available resource positions to the closest available queuing positions. Every resource position may be linked to one or more queuing positions. It will be apparent to one of ordinary skill in the art that queuing is not necessarily limited to occurring at designated locations in aisles between storage racks containing items for picking. By way of example and not limitation, queuing positions may be assigned at an empty pallet dispenser, printer station, outbound dock, staging areas, trailer dock positions, some other target station, or the like. It will further be apparent to one of ordinary skill in the art that more than one resource position may be assigned to a single queuing position.

Each robot may be directed to move from a first queuing position to a second queuing position after another robot has exited the queue. Preferably, with respect to a specific aisle or corridor, queuing positions are assigned to provide an amount of floor space proximate to the queue such that robots outside of the queue may still travel through the aisle or corridor, bypassing robots in the queue. Robots may be directed to refrain from idling in an aisle or corridor (e.g., may be directed to wait outside of an aisle or corridor) if idling in said aisle or corridor would prevent other robots from traveling through said aisle or corridor. Each robot may be directed to position itself as close as possible to an item or station location without violating queuing regulations (e.g., robots may be prohibited from blocking aisles or corridors, colliding with other robots, colliding with storage racks, some combination thereof, or the like). Each robot may further be directed to reposition itself closer to an item or station as space becomes available, provided that the robot does not violate queuing regulations, and provided that the robot is repositioning itself in a valid queuing position. It will be apparent to one of ordinary skill in the art that exemplary queuing may occur in any number of different aisles or corridors of any number of different widths, however, it is possible that in some embodiments certain aisles or corridors may be too narrow to permit other robots from bypassing queued robots.

Permission of the queue manager (e.g., QM1, QM2) may be required for a robot to approach a specific location. The queue manager may assign a queueing position to the robot before the robot approaches said location. Where multiple robots seek to approach the same group of queue positions, the queue manager may assign priority to a first queue position to the first robot to request permission to approach the specific location, a second queue position behind the first queue position to the second robot to request permission to approach the specific location, and so on.

Figure 21:
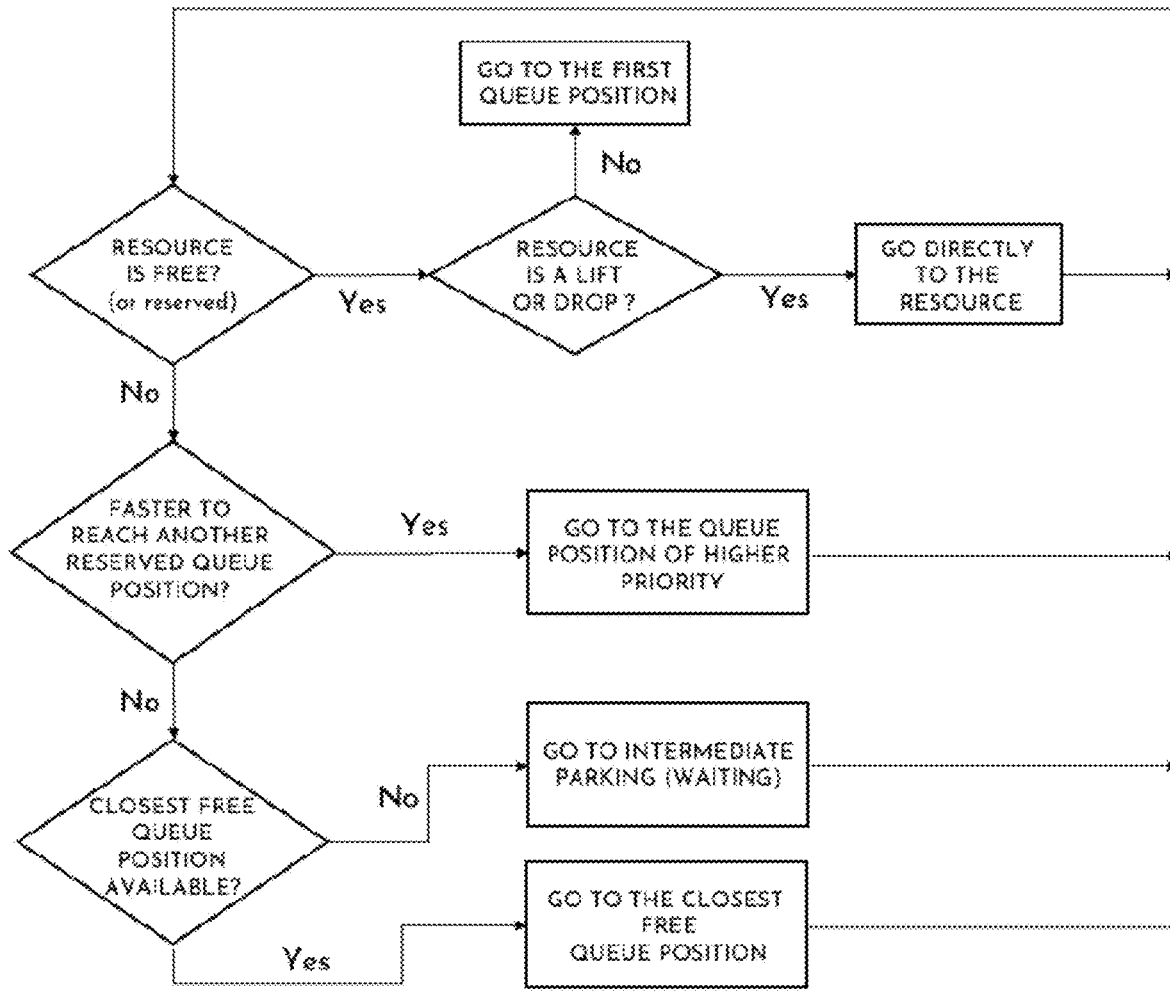
FIG. 21 illustrates exemplary logic for queueing robots in a warehouse environment based on workflow optimization instructions in accordance with an exemplary embodiment of the present invention.

Referring now to FIG. 21, an exemplary queueing method involving a queueing manager decision process 124 is shown. The aforementioned method may permit dynamic change of assigned queueing positions as robots approach aisles, corridors, or other potential queueing locations. Assignment of queueing positions is crucial, since otherwise AMRs would likely collide with one another by navigating their assigned routes. Cameras and sensors may alert AMRs for avoiding potential collisions, but nevertheless, AMRs may cluster in proximity to one another and cause traffic jams without a proper queueing framework.

Here, the queueing framework may be configured to trigger position switching in each queue only when robots are approaching a previously assigned queuing position, so as to prevent overly frequent queue switching, which may cause unnecessary traffic or delays in order fulfillment. Queue positions may be reserved by the queue manager, and the queue manager may be configured to register which robot arrives first at an assigned queueing position. The queue manager may reassign said robot to another queueing position if said robot was not directed to arrive first at that particular queueing position.

According to the method of FIG. 21, a resource may be an area designated for a lift and drop action, for a pick and print action, or the like. For a pick and print action, the resource may be a position right next to a printer or a pick location. Here, where the answer to the question "Faster to reach another reserved queue position?" is yes, the robot may be directed to a queue position of higher priority. Overtaking by one robot of another robot's assigned queue position may occur if the one robot is closer to the resource than the other robot, already occupies a queue position, already has a reservation for the resource, some combination thereof, or the like. The other robot may then forfeit its assigned queue position, and thereafter await instructions from the queue manager for finding a new queue position. In a situation where an obstruction prevents a robot from idling in an assigned queue position, the robot may be configured to detect that the position is an invalid goal, and the queueing manager may accordingly assign the robot to the next valid queueing position, which is treated as the first available one. It will be apparent to one of ordinary skill in the art that exemplary queue management may be executed manually by a human operator or alternatively according to an automated system based on heuristics functions (e.g., distance-based functions) without departing from the scope of the present invention.

Figure 22:
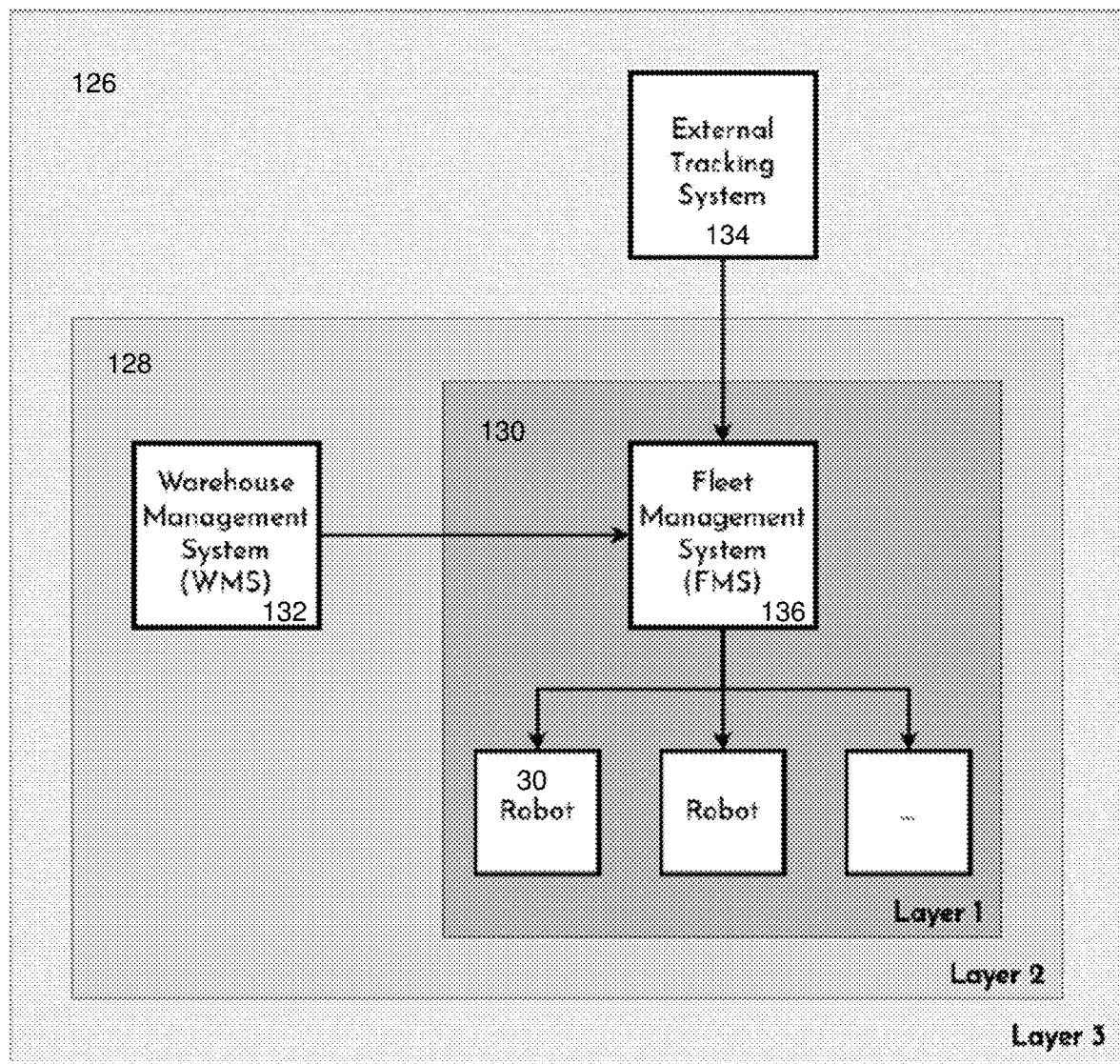
FIG. 22 illustrates exemplary logic for organizing interaction between robots and human-operated forklifts in a warehouse environment in accordance with an exemplary embodiment of the present invention.

Referring now to FIG. 22, organization of interaction between robots and human-operated forklifts in a warehouse environment may involve a fleet of robots 30 each comprising a processing unit, a Fleet Management System ("FMS") 136, an improved Warehouse Management System 132, and an External Tracking System ("ETS") 134, each divided into layers 1, 2 and 3 (130, 128, 126, respectively). The FMS 136 may be configured to assign tasks to the robots 30, and the robots may each be configured to determine which paths to take to complete the assigned tasks (e.g., based on inputs from sensors onboard). The FMS may also regulate robot movement to prevent, by way of example and not limitation, traffic and collisions. The improved Warehouse Management System 132 may provide information to the FMS 136, including by way of example and not limitation, information about which items need to be picked, line location of each item required for picking, forklift destination information, some combination thereof, or the like. The FMS 136 may use the aforementioned information to define robot actions. An external tracking system may provide forklift positions in real time to the FMS 136 to assist the FMS 136 with defining robot actions.

Figure 23:
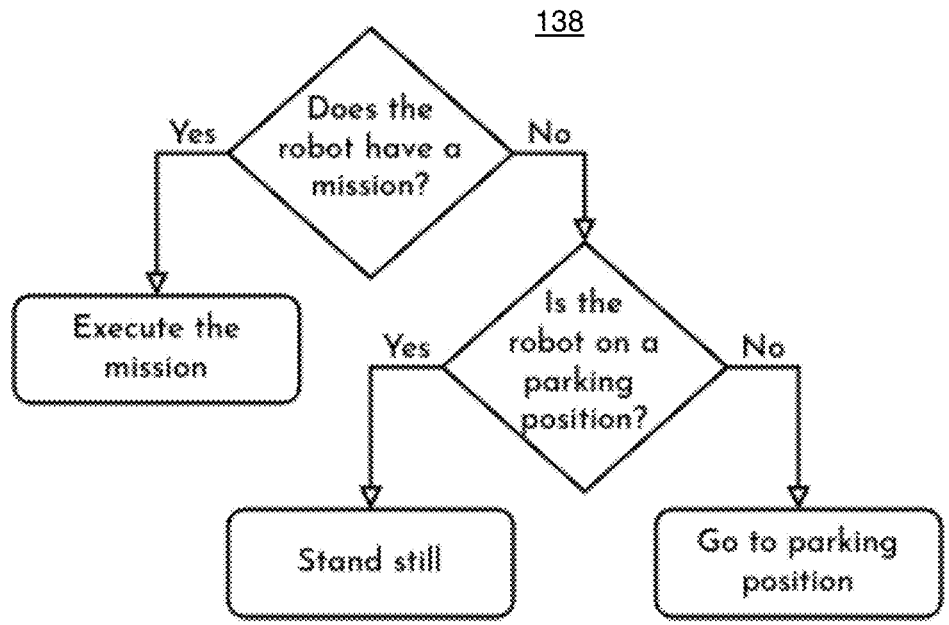
FIG. 23 illustrates other exemplary logic for organizing interaction between robots and human-operated forklifts in a warehouse environment in accordance with an exemplary embodiment of the present invention.

Referring now to FIGS. 22 and 23, Layer 1 130 may be enforced by the robots 30 and the FMS 136, and may comprise a set of rules which the robots 30 are required to obey in order to reduce potential negative impacts on the operations. Said rules may be characterized in fleet coordination algorithms (generally illustrated in FIGS. 23-27). By way of example and not limitation, a robot not having an assigned mission may be required to park at one of a number of predefined parking positions. Exemplary logic 138 for robot mission execution versus robot parking is shown in FIG. 23. Parked robots may be required to not interfere with any forklift operations. It will be apparent to one of ordinary skill in the art that addressing robot faults may be necessary to ensure robots 30 obey any rules therefor, and function properly according to fleet coordination algorithms.

Figure 24:
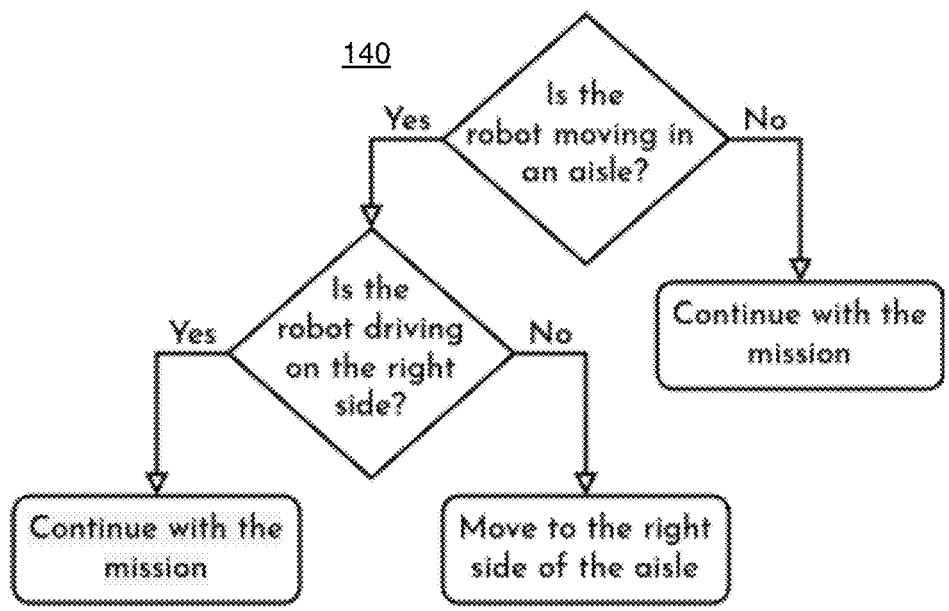
FIG. 24 illustrates yet other exemplary logic for organizing interaction between robots and human-operated forklifts in a warehouse environment in accordance with an exemplary embodiment of the present invention.
Figure 25:
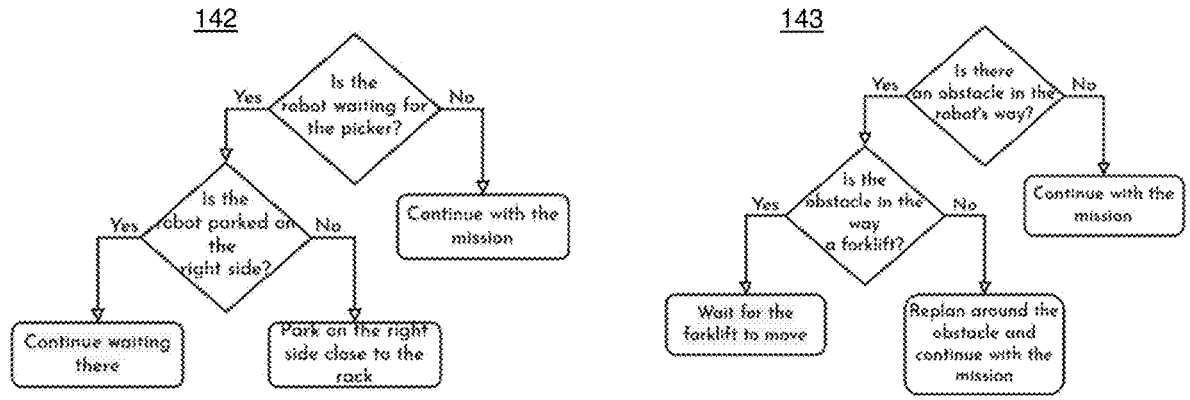
FIG. 25 illustrates yet other exemplary logic for organizing interaction between robots and human-operated forklifts in a warehouse environment in accordance with an exemplary embodiment of the present invention.

Referring to FIGS. 24-25, where exemplary logic 140, 142, 143 for organization of interaction between robots and human-operated forklifts is shown, the robots may be directed to move along a right side of an aisle while mobile, allowing forklifts to pass by the robots without obstruction. The robots, when idle waiting for pickers to place items thereon, may be positioned in close proximity to the storage racks or other picking positions on a right side of an aisle or corridor, permitting forklifts to pass by the robots on a left side thereof in said aisle or corridor without obstruction. The robot may be configured to wait a certain amount of time while idle to permit a forklift to transport items thereon. Said amount of time may be predetermined, dictated by a picker or operator based on loading requirements for an order, some combination thereof, or the like. The robots may also be configured to distinguish forklifts from other obstacles while mobile using one or more sensors or other detection technology. For said other obstacles, the robot may be configured to re-plan its route as such obstacles occur according to any number of different navigation techniques.

Figure 26:
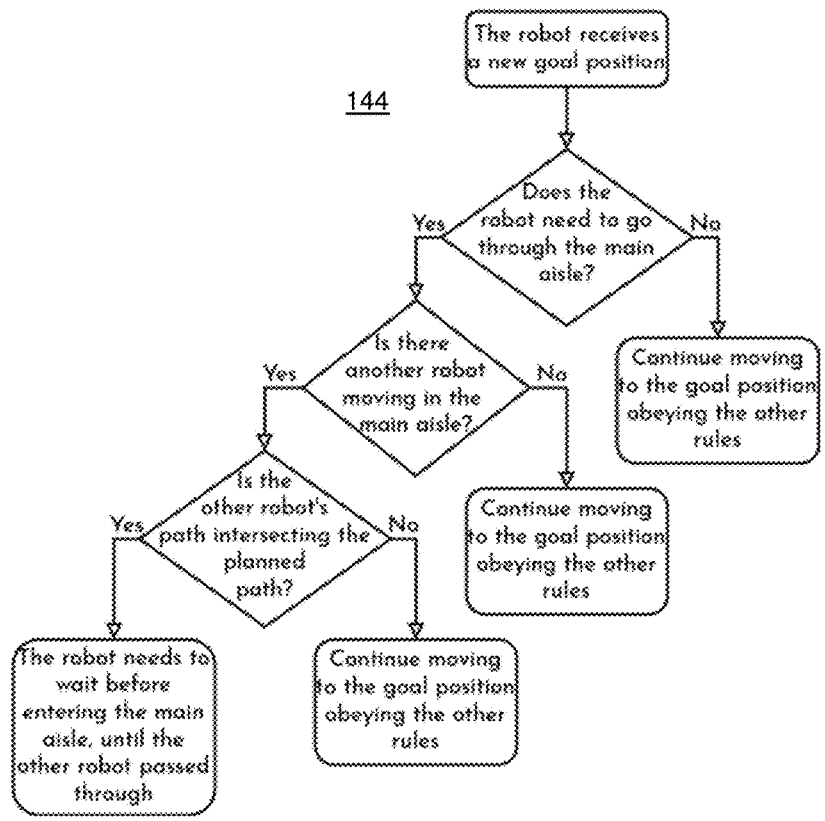
FIG. 26 illustrates yet other exemplary logic for organizing interaction between robots and human-operated forklifts in a warehouse environment in accordance with an exemplary embodiment of the present invention.
Figure 27:
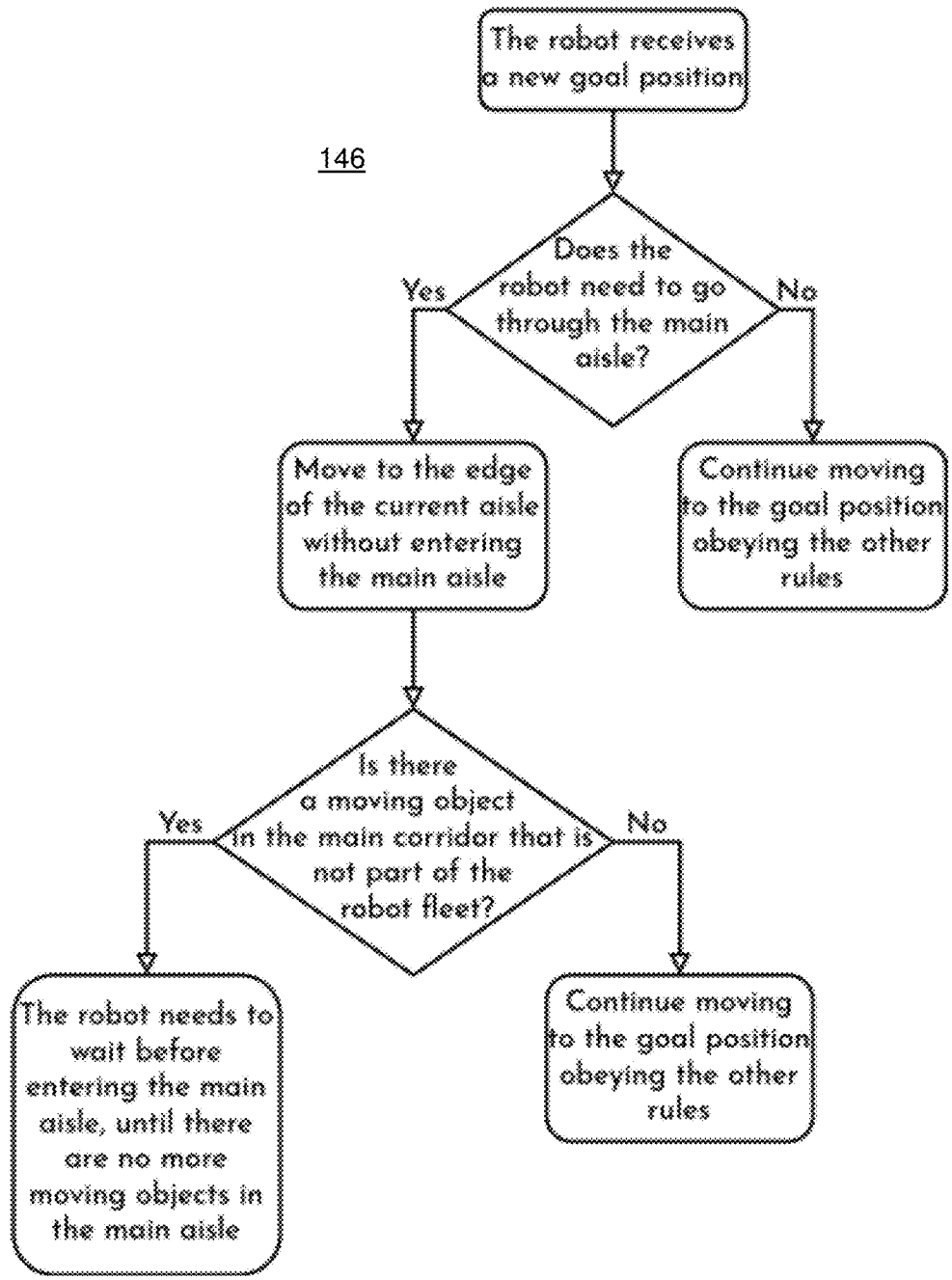
FIG. 27 illustrates yet other exemplary logic for organizing interaction between robots and human-operated forklifts in a warehouse environment in accordance with an exemplary embodiment of the present invention.

Referring now to FIGS. 26-27, additional exemplary logic 144, 146 for organization of interaction between robots and human-operated forklifts is shown. The fleet coordination algorithms (generally illustrated by FIGS. 23-27) may ensure main aisles are kept navigable. Robots in main aisles (e.g., larger aisles connecting smaller aisles divided between storage racks) may be assigned movement priority over other robots (e.g., robots positioned in smaller aisles divided between storage racks). Parking positions, idling positions, queueing positions, other waiting positions, and the like are preferably assigned at locations away from the main aisles.

The robots may be programmed to recognize the difference between main aisles and other aisles or corridors. Alternatively or additionally, an exemplary management system may be configured to communicate to each robot whether said robot is positioned in a main aisle, or another aisle or corridor not being a main aisle. The robots may be programmed to refrain from parking, idling, queuing or otherwise waiting in a main aisle. Alternatively or additionally, the exemplary management system may be configured to communicate to each robot that said robot is restricted from parking, idling, queuing or otherwise waiting in the main aisle. It will be apparent to one of ordinary skill in the art that any aspect of any fleet coordination algorithm or technique described herein may be preprogrammed, communicated by an external system, communicated by internal processors, some combination thereof, or the like without departing from the scope of the present invention.

Referring specifically to FIG. 26, where a first robot is directed to travel through a main aisle, and a second robot's path is determined to intersect the first robot's path in the main aisle, the first robot may be directed to wait outside of the main aisle until the second robot has passed therethrough. The management system may determine that the second robot is estimated to enter the main aisle first, and thus assign priority in navigating the main aisle to the second robot over the first robot.

Referring specifically to FIG. 27, a warehouse and/or mobile objects therein may be configured with sensors permitting tracking of moving objects (e.g., forklifts) in the aisles and corridors thereof, including the main aisles. By way of example and not limitation, tracking of said moving objects may occur by way of lidar sensing (e.g., 2D and/or 3D lidar), radiofrequency sensing, cameras, fusion sensing, GPS tracking, some combination thereof, or the like. Referring now to FIGS. 22 and 27, scheduled forklift activity may also be communicated from the improved WMS 132 to the fleet management system 136. It will be apparent to one of ordinary skill in the art that any number of different devices or methods for tracking certain or all moving objects in a warehouse, and communicating object movement to the robot fleet may be employed without departing from the scope of the present invention. Each robot 30 may be configured to wait for non-robot objects to leave a main aisle before the robot 30 enters the main aisle. The robot 30 may be directed to move to an edge of its current aisle or corridor location while waiting for the main aisle to become available. The fleet management system 136 may issue permission to the robot 30 to enter the main aisle once the main aisle become clear.

The scheduled forklift activity communicated from the improved WMS 132 to the fleet management system 136, and in turn communicated to the relevant robots, may include by way of example and not limitation, information about when a forklift starts a task, forklift destination information, location of a forklift when the forklift driver scans an item/rack position, some combination thereof, or the like. Said information may be used by the fleet management system 136 in accordance with the optimization module to prevent collisions, traffic and the like in warehouse aisles and corridors.

The external tracking system 134 may register the location of each forklift at any given time. Location registration may occur by way of an indoor localization system, involving by way of example and not limitation, UWB tracking, WPS tracking, motion capture system tracking, another system providing position data in real-time, some combination thereof, or the like. The external tracking system 134 may communicate forklift location data to the fleet management system 136, which may in turn, in accordance with the optimization module, reroute or temporarily halt robots having active routes anticipated to cross a forklift location to prevent robot traffic, collisions, some combination thereof, or the like. Additionally, robot sensors may be configured to restrict each robot from directly contacting other moving objects such as forklifts. By way of example and not limitation, when a robot sensor determines that a moving forklift is less than a minimum predefined distance away, the robot may be directed to stop. Although in the embodiment shown, the fleet management system 136 of Layer 1 (130) is directed to receive and process information from the improved WMS 132 of Layer 2 (128) and the external tracking system 134 of Layer 3 (126) to regulate robot activity, it will be apparent to one of ordinary skill in the art that this configuration is merely illustrative, and is not intended to be exhaustive.

In an exemplary embodiment, Layer 2 (128) may be utilized when communication between the WMS 132 and the FMS 136 is established. Layer 2 (128) may be used to permit the FMS 136 to provide information about assigned forklift tasks to robots 30. In an exemplary embodiment, Layer 3 (126) may be utilized when communication between the external tracking system 134 and the FMS 136 is established. Layer 3 (126) may be used to, by way of example and not limitation, permit the FMS 136 to regulate robot 30 activity based on registered information provided in real time about forklift positions, permit information about forklift positions to be communicated to various warehouse actors, some combination thereof, or the like. The aforementioned communications may be electronic communications between each of multiple software modules of one or more processors.

Referring now to FIG. 28, exemplary logic 148 for streamlined fulfilling of robot 30 energy requirements in a warehouse environment is shown. An objective of streamlined fulfilling of robot energy requirements is to prevent robots from running out of power while engaged in order fulfillment operations. An exemplary, fully charged robot battery (e.g., a charged 48V, 87 Ah external battery) may provide by way of example and not limitation, around eight hours of AMR autonomy. A single robot battery may provide the primary power source to an AMR. A robot may start a shift with a fully charged battery, and the length of the shift may exceed the AMR autonomy duration capacity of the battery, requiring the battery to be recharged, swapped, some combination thereof, or the like for the robot to continue operations during said shift. In one embodiment, a robot having a main battery with a state of charge ("SOC") lower than a predetermined threshold level (e.g., below 10% remaining) may undergo opportunity charging to have SOC restored to a level sufficient for the robot to continue and preferably finish its shift without further battery attention. In another embodiment, a robot having a main battery with an SOC lower than a predetermined threshold level may undergo hot swapping to have a different, fully charged battery replace the initial, depleted main battery, such that the robot may continue and preferably finish its shift without further battery attention. It will be apparent to one of ordinary skill in the art that an exemplary robot is not necessarily limited to either opportunity charging or hot swapping, though certain robots may be better adapted or adjusted for one over the other. By way of example and not limitation, hot swapping may be preferable for a robot presently engaged in an order fulfillment mission, and/or for a robot with a long list of pending assignments.

Each robot may be configured to alert an Execution Manager of an exemplary management system when the robot's main battery SOC drops below a predetermined threshold level. The Execution Manager may communicate to the Fleet Manager that the robot requires more power, and the Fleet Manager may direct the robot accordingly. Autonomous opportunity charging may involve a Fleet Manager directing a robot to drive to a charging station, dock into the charging station, and begin charging its main battery. The robot may be directed to charge its battery until fully charged, until some other specified SOC is reached, until the Fleet Manager requests the robot to stop charging, some combination thereof, or the like. Once charging is finished, the robot may undock from the charging station and await further work orders from the Fleet Manager.

Hot swapping may involve switching out a depleted main robot battery with a sufficiently charged main robot battery without turning off any computing units of the robot. Hot swapping may be achieved by initiating an auxiliary internal battery to provide power for all computing units (e.g., for keeping all software components up and running) while the main battery is switched. Thus, hot swapping may enable the robot to immediately continue its operation after the replacement, sufficiently charged battery is put into the robot. The Execution Manager may include by way of example and not limitation, an order picking engine, an improved WMS, ERP software, some combination thereof, or the like. The Execution Manager may generate tasks for the robotic fleet. The Fleet Manager may be electronic communication with both the Execution Manager and the robotic fleet for regulating activity, including, e.g., charging activity, of the robotic fleet.

A charging management module may determine when and how a robot should be charged. The charging management module may compare each robot's main battery SOC with a predetermined minimum SOC level to determine which robots require charging and when. For each robot requiring charging, the charging management module may determine whether hot swapping or opportunity charging is preferable based on consideration of factors including by way of example and not limitation, AMR type, schedule, location, some combination thereof, or the like. When opportunity charging is elected, the robot may be directed to the closest charging station. When hot swapping is elected, the charging management module may determine the type of battery required for the robot, and may send another robot or warehouse worker to retrieve said type of battery and deliver it to the robot.

Blocks 3,4,5 show N AMRs (30) in a robot fleet. Each robot may be configured with onboard sensors for autonomous execution of tasks provided as work orders by the Fleet Manager, according to exemplary algorithms. Possible tasks include by way of example and not limitation, driving to a particular location, picking up an empty pallet, moving and dropping loaded pallets, docking at charging stations, some combination thereof, or the like. Each charging station (e.g., Blocks 9, 10, 11) may be configured to communicate status information to the Fleet Manager. For example, where a charging station is not functioning properly, the charging station may be configured to communicate its non-functional status to the Fleet Manager, so the Fleet Manager only directs robots to functioning charging stations. Spare AMR batteries (e.g., for hot swapping) are illustrated by Blocks 9, 10, 11.

Referring now to FIG. 29, an exemplary Fleet Manager may include a number of different modules configured to provide, by way of example and not limitation, real-time fleet visualization, project (work order) setup, syncing projects on multiple robots, mission management and scheduling, management of spatial and temporal characteristics of multiple robots and movement thereof, charging management, some combination thereof, or the like. A charging management module 150 of the exemplary Fleet Manager may optimally direct both opportunity charging and hot swapping opportunities by minimizing the time each AMR is temporarily immobile due to charging.

The charging management module 150 may consider a number of different algorithm inputs for determining how and when to restore proper SOC. Inputs considered may include by way of example and not limitation, a list of pending tasks received from an Execution Layer of the Fleet Manager (e.g., the Fleet Manager may store lists of pending tasks in its database(s)), AMR statuses (e.g., idle, in mission, faulted, SOC, or the like) communicated in real time, number of charging stations available for AMR opportunity charging (may be set as an input parameter), location of charging stations available for AMR opportunity charging, number of batteries available for hot swapping (may be set as an input parameter), locations of batteries available for hot swapping, some combination thereof, or the like.

According to an exemplary algorithm of FIG. 29, the charging management module 150 may determine when an AMR is be charged based on a number of criteria. In this particular embodiment, BATTERY_LOW_SOC AMR represents a first state of charge threshold. Where an AMR SOC drops below a value for said first threshold, the AMR may be directed to a charging station or otherwise linked to a charging resource (sent to a charging station if available, sent another charged main battery if available, or the like), provided there are no other pending tasks. In this particular embodiment, BATTERY_CRITICAL_SOC AMR represents a second state of charge threshold. Where an AMR SOC drops below a value for said second threshold, the AMR may be marked as unavailable for tasks by the Fleet Manager, and may accordingly be linked immediately to a charging resource. In this particular embodiment, BATTERY_HIGH_SOC AMR represents a third state of charge threshold. When an AMR is charging and SOC raises above a value for said third threshold, the AMR may be commanded to stop charging and address a new pending task as soon as the new pending task is issued.

The charging management module 150 may update certain variables at certain steps of the algorithm as it receives new data from the Fleet Manager according to the Execution Layer, and/or as it receives new data from the AMRs. Said variables may include by way of example and not limitation, PENDING_TASKS_NUM, which in this particular embodiment represents the number of tasks to be executed by the fleet. For ROBOT1_SOC, ROBOT2_SOC, . . . , ROBOT-N_SOC represents the SOC of each robot in the fleet in this particular embodiment. The charging management module may also track the status of each charging resource, recognizing which charging stations are available, which spare batteries are available for hot swapping, some combination thereof, or the like.

Initially, all K batteries may be considered available for hot swapping. As depleted batteries are removed during hot swapping, the removed batteries may be marked as unavailable by the charging management module 150. The charging management module 150 may be configured to mark said batteries as available after each battery has been charged to above a monitored minimum SOC threshold, after a predetermined amount of charging time has passed, some combination thereof, or the like. The module 150 may estimate charging time based on the initial battery SOC (e.g., stored in ROBOT1_SOC), and an assumption that an operator will immediately put the battery on charge when directed to. Likewise, initially all M charging stations may be considered available for opportunity charging. As the module 150 sends AMRs to the charging stations, stations occupied by charging AMRs may be marked as unavailable until charging is finished.

Referring now to FIG. 30, exemplary power schematics 152 of a single AMR 30 are shown, wherein each aspect illustrated may be powered 154 by or otherwise be in electronic communication 156 with other aspects shown. Power schematics may include by way of example and not limitation, charging racks 158, external batteries 162, power boards 164, internal batteries 166, charging pads 168, charging docks 170, and the like. For opportunity charging, the AMR 30 may be equipped with charging pads 168, which may be directly connected to a Main (External) battery 162. The charging dock 158 may be connected to a power grid of the warehouse. The charging dock 158 may include built-in charging plates enabling connection to the pads 168 on the AMR 30.

Hot swapping may be advantageous during peak hours in a shift when order fulfillment is in high demand. Hot swapping may require a user to exchange the Main battery 162 while main system components stay powered by at least one backup, internal battery 166 (e.g., 24V, 7 Ah battery connected to the Powerboard 164). Power may be rerouted from the Main battery 162 to from the internal battery 166 in a matter of milliseconds. A charging rack 170 may be utilized for charging the Main (External) battery 162. In the AMR 30, all electrical energy sourced from the Main (External) battery 162 may be distributed through the Powerboard 164. The Powerboard 164 may comprise a number of electronic features adapted to convert and output multiple voltage levels required for the system 160 to operate.

Referring now to FIG. 31, exemplary logic 172 for mapping features of a warehouse environment having improved workflow is shown. Sensor data may be obtained using any number of different robots, autonomous non-human elements, and/or other non-human elements. In this particular embodiment, The Frontend N block may be responsible for reading and processing all geospatial sensor data, estimating visual odometry, building keyframes, and the like. The Fronted N block may be configured to store all relevant data in a keyframe object at a keyframe database. Data stored at the Keyframe database may be read by a second main building block, Backend. The Backend block may be responsible for detecting loop constraints, building submaps and optimizing a pose graph using keyframe data from all available trajectory blocks. In this particular embodiment, there is only one Backend block, but the number of Backend blocks may be different in other embodiments. In this particular embodiment, the number of Frontend blocks is limited only by CPU processing power and available RAM.

Two main modes of operation may be supported in this particular embodiment: a mapping mode and a localization mode. It will be apparent to one of ordinary skill in the art that additional modes of operation may be employed in other embodiments without necessarily departing from the scope of the present invention. Here, the mapping mode may be used when the AMR initially enters a new environment. The AMR may be navigated through the environment according to user instructions, and a map may be built in real-time as the AMR navigates therethrough based on data and/or imagery collected by AMR cameras, AMR sensors and/or other relevant sensors and/or cameras, other image capturing techniques, some combination thereof, or the like. Once a relevant warehouse area has been mapped, the map may be stored and used in a localization mode. Subsequent AMRs entering the facility may be provided with said map, and a system localization mode may be initiated accordingly.

Two main functions of the Frontend block may include estimating visual odometry and building a keyframe. Main data required for the Frontend processing may include a continuous stream of synchronized, undistorted and rectified grayscale images, preferably at frequencies higher than 5 Hz. Additionally, IMU data and pixel-wise semantic segmentation data may be used to increase estimation accuracy. Estimating visual odometry may start at Block 1. Here, from every received left image, geometric features such as FAST or GFTT may be extracted. Where semantic data is available, every feature may also be assigned a semantic label, which may be used to filter out certain features, increase feature weight in the optimization process, some combination thereof, or the like. Extracted features may be sent to Block 2 and Block 3.

At Block 2, extracted features from a current left image may be matched in the right image using a patch-based method, including, for example, sparse optical flow. Matching may be performed in two steps. The first features from the left image may be matched in the right image, and then resulting matches in the right image may be matched in the left image. A match may be considered valid only if the distance between the initial feature in the left image and the final feature in the left image is lower than a predefined threshold. All valid matches may be sent to Block 4.

Features extracted from one image pair, together with the IMU data and estimated pose of a camera at the moment of recording the image pair, may be stored in Block 3 (e.g., in a data structure referred to as a frame). The number of stored frames are preferably limited to permit real-time operation, and Block 3 may be responsible for deciding which frames to keep, and which frames to trim depending on their information gain. Block 4 may receive matched features from Block 2 and use the same or a like matching principle thereof to find matches between the past frames kept in Block 3. IMU data may be used to estimate the position of features from the past frames in the current frame. Using IMU data may enable faster and more robust feature matching (e.g., since features outside a prediction envelope may automatically be discarded). All the valid matches may then be sent to Block 5 in order to estimate the current camera pose.

Block 5 may use all the matches between features in the current frame and frames kept in Block 3, together with the IMU and semantic data, to form a bundle adjustment-like estimation problem. The problem may be solved using numerical integration. The solution may be applied to correct the poses of all frames and positions of all features kept in Block 3. The pose of the current frame estimated in Block 5 may be one of the prerequisites to build a keyframe. Not all new image pairs necessarily trigger a keyframe build. A new keyframe may be built only when it is determined that the current image pair holds enough new information in comparison to the image pair used to build a previous keyframe. Once a current image pair is selected for a keyframe, the keyframe build process may start at Block 6.

To the start of visual odometry process, Block 6 may extract features from the left image. Since there is much more time between the two keyframes than the two frames, different feature extractors may be used. Here, a neural network-based feature extractor may be employed to extract features and their descriptors. By extracting features and descriptors this way, a much more robust feature matching resilient to lighting changes, weather conditions, large field of view differences, some combination thereof, or the like may be permitted. Extracted features with their descriptors may be sent to Block 7.

In Block 7, extracted features from the left image may be matched to the features in the right image in a similar way as in Block 2. All the successful matches, together with the descriptors from the left image may be sent to Block 8 for triangulation. In Block 8, for every feature match received from Block 7, triangulation is attempted to estimate local depth of a feature in the left camera frame. The triangulation process may use information about the current estimate of the relative pose between the left and the right cameras, and the positions of the feature in the left and right images determined by the extraction and matching algorithms. Matches that are successfully triangulated may be sent to the keyframe builder in Block 9, together with their descriptors and estimated depth.

Before keyframe may be built in Block 9, a global descriptor of that keyframe may be required (loop constraint estimation has to be estimated in Block 10). The global descriptor may be used to describe an entire left image in a way that may be efficiently and accurately compared to the images of all other keyframes. For this particular task, another neural network may be used. A main advantage of using an AI model, instead of approaches based on Bag of Words, is that the resulting descriptor may be more robust to changes in the images resulting from different lighting, weather conditions, other dynamics in the environment, or the like.

Once relevant information arrives to Block 9, keyframe data structure may be created from pose, features, descriptors, global descriptor, some combination thereof, or the like. Once built, keyframe data may be stored in the keyframe database where it is ready to be used by the Backend block. Main functions of the Backend block may include generating loop constraints, building submaps, optimizing pose graph, some combination thereof, or the like. Loop constraints may be estimated in the form of relative poses between two keyframes, and may be essential for accurate pose graph optimization. Submaps may be a collection of N neighboring keyframes built by the same Frontend block. A pose graph may be a graph representation of all the keyframe poses (nodes) and all the odometry and loop constraints (edges) between them. Whenever one of the active Frontend blocks adds a new keyframe data to the keyframe database, Backend operations for submap building and constraint calculation may be triggered.

When a new keyframe is added, Block 11 may extract its global descriptor from the keyframe database, and find the best matches using a KNN clustering method. If the resulting matches have a similarity score higher than the defined threshold, and if the resulting matches are built with enough time difference, their IDs, together with the ID of the newly added keyframe, may be sent to Block 12 for further processing. For each received match, Block 12 may run a feature matching between the current (query) keyframe and the matched (candidate) keyframe. Features are not necessarily only matched merely between the query-candidate pair, but also may be matched between the predefined number of neighboring keyframes located at the respective submaps query-candidates belong to. Additional keyframes for matching may be considered if certain conditions are met. Said conditions may include by way of example and not limitation, whether there are multiple frontends running at the same time, whether extrinsic calibration between their left cameras and the left cameras of a query-candidate pair is known, whether left cameras are triggered at the same time, some combination thereof, or the like.

When certain conditions are met, keyframes may be generated by additional frontends with the same timestamps. Query-candidate keyframes may also be considered for feature matching, together with the predefined number of keyframes from their respective submaps. Ultimately, features may be matched between two sets of keyframes. The query set may consist of the query keyframe, all the keyframes from other frontends taken at the same time, a number of keyframes from each of their submaps, or the like. The candidate set may consist of the candidate keyframe, all the keyframes from other frontends taken at the same time, a number of keyframes from each of their submaps, or the like.

To reduce the number of attempted matches, not every keyframe from the query set may be matched with every keyframe from the candidate set. Rather, an assumption may be made that the initial query-candidate pair shares a larger part of the field of view. It also may be considered that the known relative pose between each frontend left cameras' only keyframes share similarly larger fields of view. Said frontend left camera keyframes may be matched together. Feature matching may be achieved by the neural network trained to take full advantage of descriptors generated by an AI model. The aforementioned approach may ensure high reliability in feature matching crucial for accurate loop detection, because keyframes in the query and the candidate set may be taken between large time differences. Each matched feature pair may be then sent to Block 13.

Block 13 may use all the feature matches, and the local depths of all the features matched in the candidate set to calculate initial relative pose estimation between the query and the candidate keyframes. Relative pose estimation may be achieved using the known random sample consensus algorithm ("RANSAC") with the known Perspective-n-Point model technique. Where the number of inliers for the best rated model is larger than a defined threshold, a pose estimate is considered valid and sent to Block 14, together with inlier matches for further refinement. Block 14 may use initial estimate and matched pairs to further refine inlier pose. Said further refinement may be achieved by formulating a nonlinear estimation problem in which residuals may be formed as reprojection errors for each matched pair. The pose estimation may be considered valid if an ultimate solution has above a threshold level of inliers. After validity of the ultimate solution is verified, the pose estimation may be sent to final validation at Block 15.

Block 15 may use the poste estimation to generate geometrically constrained descriptor matching between all the features from the candidate set and an extended query set. The query set may be extended by additional keyframes from the query keyframe submap, and from neighboring submaps not in the initial query set. A constraint may be considered valid if there are enough valid matches found therefrom. Valid constraints may be added accordingly to a constraint database. Every time a new constraint is added to the constraint database, a trigger may be sent to Block 18. All constraints from the constraint database, and all the keyframe data from the keyframes database may be considered in a pose graph optimization for minimizing relative pose residuals formed by each constraint. Once pose graph optimization is achieved, updated poses may be propagated to the constraint database, and poses of every keyframe may be updated accordingly.

Adding a new keyframe to the database may initiate a keyframe search in Block 11, and may also trigger Block 16.

Adding a new keyframe may cause new submaps to be built for each of the active Frontends. When a current submap has above a threshold number of keyframes, it may be marked as finished, and added to the submap database. A finished submap may additionally be sent to Block 17 for feature filtering. A main purpose of Block 17 is to reduce the number of features in the keyframes contained within the finished submap. In a first step, features lacking depth associated with them (e.g., triangulation failed) may be removed, together with their descriptors. In a second step, remaining features may be tracked using geometrically constrained descriptor matching between all the keyframes in the submap. If the number of tracks for a feature is lower than a defined threshold for said feature, the feature may be removed, together with its descriptor.

The aforementioned first step may ensure that the candidate set built during constraint calculation contains only features that have local depth estimation. Depth estimation may be required for at least one feature in each pair to formulate a reprojection residual (permitting all the features from the query set that are unable to currently pass the second filtration step to be available for potential use in feature matching). The candidate set may also contain only features successfully tracked in several keyframes within the submap, ensuring high reliability and accuracy. Having fewer features in the keyframe database in accordance with exemplary feature filtering may improve ease of map saving. Remaining features may be checked for sufficient reliability, description and depth accuracy to make the map optimally suited for localization.

Block 19 and Block 20 may be used for storing and loading the keyframe database (sparse map) to/from a permanent memory. During mapping, when a user decides sufficient area is mapped, Block 19 may be engaged. Block 19 may be configured to serialize entire keyframe databases to the permanent memory in the form of a proto file. Serialized data may include by way of example and not limitation, keyframe metadata (e.g., ID, timestamp, submap ID, pose), all remaining features, all remaining feature descriptors, all local depth estimations, submap feature tracking information, some combination thereof, or the like. Block 20 may be engaged to recreate sparse map from the proto file every time localization mode is initiated.

In localization mode, there may be no differences in data flow of the Frontend block. When starting a localization mode instance, Block 20 may first be used to load the keyframe database from the stored proto file. Once a map is loaded, data flow may remain substantially consistent. However, in the particular embodiment of FIG. 31, Blocks 11 and 18 have modified behavior after the map is loaded. When the localization mode is initialized, the initial pose of the robot in the map may be estimated or determined first. Initial pose may be estimated or determined using global descriptors. In the specific embodiment shown, once the initial pose is estimated, Block 11 no longer uses global descriptors to find potential keyframe matches. Rather, in this particular embodiment, Block 11 searches the map neighborhood around the current robot pose, and accounts for all the keyframes within the searched neighborhood. Pairs of current keyframe ID and found close keyframes may be sent in the same or a substantially similar way as with the mapping mode to Block 12. Block 18 may again consider all the constraints and keyframes in their respective databases. However, keyframes loaded from the map file may be used only as anchors for keyframes added during localization mode without additional pose optimization. It will be apparent to one of ordinary skill in the art that the specific differing block functions and operating behaviors described herein are merely illustrative, and any number of different modifications may be made to the specific block functions and operating behaviors without necessarily departing from the scope of the present invention.

A trimmer block may be introduced. The trimmer block may be responsible for ensuring that in localization mode, memory usage remains constant. In localization mode, only current robot pose may be required, and may be estimated based on an already built map. Thus, only recently added data may be required, while older data may be removed from the memory. The trimmer block may be triggered whenever a new submap is added. The trimer block may ensure that only data contained within the last N submaps is kept, while all the keyframes and constraint data contained within the older submaps, together with the submaps themselves, may be trimmed. It will be apparent to one of ordinary skill in the art that the specific block names and numbering included herein are merely illustrative, and any number of different block names and numbering may be provided without departing from the scope of the present invention. Furthermore, additional blocks may be included without necessarily departing from the scope of the present invention.

Any embodiment of the present invention may include any of the features of the other embodiments of the present invention. The exemplary embodiments herein disclosed are not intended to be exhaustive or to unnecessarily limit the scope of the invention. Although embodiments descried herein generally relate to warehouse operations, it will be apparent to one of ordinary skill in the art that embodiments of the present invention may be useful in any number of different environments, including but not limited to those involving order fulfillment and inventory management. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A system for regulating robot activity comprising:
one or more central processors;
a plurality of robots, each in communication with at least one of said one or more central processors, and each capable of performing an activity, wherein said activity is at least one selected from the group of obtaining, transporting, and depositing a resource;

wherein each robot of said plurality of robots is capable of traveling to any of a number of different queuing positions;

wherein software instructions of said one or more central processors are capable of causing a first robot of said plurality of robots to travel to a first queuing position of said number of different queuing positions, said first queuing position adjacent to and separate from a second queuing position occupied by a second robot of said plurality of robots; and wherein software instructions of said one or more central processors are capable of causing said first robot to remain at said first queuing position at least until a subsequent position assigned to said first robot is available.

2. The system of claim 1, wherein said number of different queuing positions are each located at a warehouse.

3. The system of claim 2, wherein said first queuing position is at least one selected from the group of a portion of an aisle floor, an area proximate to a storage rack, a staging area, a trailer dock area, an area proximate to an empty pallet dispenser, and an area proximate to a printer station.

4. The system of claim 3, wherein said first queuing position is located inside a trailer, and said second queuing position is proximate to the trailer.

5. The system of claim 1, wherein said one or more central processors are configured to associate a storage location of said resource with at least one queuing position.

6. The system of claim 1, further comprising a queueing manager.

7. The system of claim 1, wherein said one or more central processors are configured to cause the first robot to travel to the second queuing position after the second robot leaves the second queuing position.

8. The system of claim 1, wherein said one or more central processors are configured to cause position switching in a queue when a robot of said plurality of robots approaches a previously assigned queuing position.

9. The system of claim 1, wherein said one or more central processors are configured to cause position switching in a queue when a robot of said plurality of robots is assigned to a queuing position that is already occupied by another robot.

10. The system of claim 1, wherein said first robot is capable of detecting obstructions.

11. A system for regulating robot activity comprising:
one or more central processors;
a plurality of robots, each in communication with at least one of said one or more central processors, and each capable of performing an activity, wherein said activity is at least one selected from the group of obtaining, transporting, and depositing a resource;
wherein each robot of said plurality of robots is capable of traveling to any of a number of different queuing positions, at least one of which is a portion of an aisle floor;
wherein software instructions of said one or more central processors are capable of causing a first robot of said plurality of robots to travel to a first queuing position of said number of different queuing positions, said first queuing position adjacent to and separate from a second queuing position occupied by a second robot of said plurality of robots;
wherein software instructions of said one or more central processors are capable of causing said first robot to remain at said first queuing position at least until a subsequent position assigned to said first robot is available;
wherein software instructions of said one or more central processors are capable of causing said first robot to travel to said second queuing position after said second robot leaves said second queuing position; and
wherein said one or more central processors are configured to associate a storage location of said resource with at least one queuing position.

12. The system of claim 11, further comprising a queuing manager.

13. The system of claim 11, wherein said portion of said aisle floor is located proximate to a storage rack.

14. A method for regulating robot activity comprising:
providing one or more central processors;
providing a plurality of robots, and configuring each to be in communication with at least one processor of said one or more central processors, and to be capable of performing an activity, wherein said activity is at least one selected from the group of obtaining, transporting, and depositing a resource;
configuring each robot of said plurality of robots to be capable of traveling to any of a number of different queuing positions;
configuring software instructions of said one or more central processors to be capable of causing a first robot of said plurality of robots to travel to a first queuing position of said plurality of queuing positions, said first queuing position adjacent to and separate from a second queuing position occupied by a second robot of said plurality of robots; and
configuring software instructions of said one or more central processors to be capable of causing said first robot to remain at said first queuing position at least until a subsequent position assigned to said first robot is available.

15. The method of claim 14, further comprising providing a queue manager at an aisle of a warehouse.

16. The method of claim 15, further comprising determining, using the queue manager, which robot of said plurality of robots to assign to a particular queuing position of multiple different queuing positions in said aisle.

17. The method of claim 15, further comprising causing, using the queue manager, a robot of said plurality of robots to travel to a subsequent queuing position when obstructions prevent said robot from arriving at an initial queuing position.

18. The method of claim 14, further comprising configuring said one or more central processors to associate a storage location of said resource with at least one queuing position.

19. The method of claim 14, wherein said first queuing position is at least one selected from the group of a portion of an aisle floor, an area proximate to a storage rack, a staging area, a trailer dock area, an area proximate to an empty pallet dispenser, and an area proximate to a printer station.

20. The method of claim 14, further comprising configuring said one or more central processors to cause position switching in a queue when a robot of said plurality of robots is assigned to a queuing position that is already occupied by another robot.

* * * * *